US011139954B2

(12) United States Patent
Mercuri et al.

(10) Patent No.: US 11,139,954 B2
(45) Date of Patent: Oct. 5, 2021

(54) BLOCKCHAIN PROOF OF CUSTODY, PROOF AGAINST TAMPERING, PROOF OF CHAIN OF CUSTODY

(71) Applicant: Microsoft Technology Licensing, LLC, Redmond, WA (US)

(72) Inventors: Marc E. Mercuri, Seattle, WA (US); Zeyad Rajabi, Seattle, WA (US); Eric I. Maino, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 183 days.

(21) Appl. No.: 15/995,070

(22) Filed: May 31, 2018

(65) Prior Publication Data

US 2019/0013934 A1 Jan. 10, 2019

Related U.S. Application Data

(60) Provisional application No. 62/530,081, filed on Jul. 7, 2017.

(51) Int. Cl.
*H04L 9/06* (2006.01)
*G06Q 20/06* (2012.01)
(Continued)

(52) U.S. Cl.
CPC ............ *H04L 9/0637* (2013.01); *G06F 9/451* (2018.02); *G06F 9/542* (2013.01); *G06F 9/546* (2013.01);
(Continued)

(58) Field of Classification Search
CPC ............ H04L 2209/38; H04L 2209/56; H04L 9/06–0668; H04L 9/32–3297; H04L 63/10–126; G06F 16/904; G06F 21/60–645; G06F 9/451; G06F 9/542; G06F 9/546; G06F 11/3072; G06F 11/3476; G06F 16/27; G06N 20/00; G06N 3/08; G06Q 2220/00; G06Q 20/02–0658; H04W 4/70
See application file for complete search history.

(56) References Cited

U.S. PATENT DOCUMENTS 6,161,139 A * 12/2000 Win ..................... G06F 21/604
709/223
7,554,542 B1 6/2009 Ferraro et al.
(Continued)

FOREIGN PATENT DOCUMENTS

WO 2017098519 A1 6/2017

OTHER PUBLICATIONS

"Non Final Office Action Issued in U.S. Appl. No. 15/995,062", dated May 21, 2020, 31 Pages.
(Continued)

*Primary Examiner* — Madhuri R Herzog
(74) *Attorney, Agent, or Firm* — Mannava & Kang, P.C.

(57) ABSTRACT

According to an embodiment of the present disclosure, an event interface system, hereinafter the system, provides a record storage system and facilitates a proof of custody, proof of chain of custody and proof against tampering for a record by deploying a hash of the record on the blockchain and storing the record on an off-chain storage.

20 Claims, 9 Drawing Sheets

(51) Int. Cl.

| | | |
|---|---|---|
| *G06F 21/60* | (2013.01) | |
| *H04L 9/32* | (2006.01) | |
| *G06F 21/64* | (2013.01) | |
| *H04L 29/06* | (2006.01) | |
| *G06Q 20/38* | (2012.01) | |
| *G06Q 20/40* | (2012.01) | |
| *G06Q 20/02* | (2012.01) | |
| *G06F 16/904* | (2019.01) | |
| *G06N 20/00* | (2019.01) | |
| *G06F 11/30* | (2006.01) | |
| *G06F 11/34* | (2006.01) | |
| *G06F 9/451* | (2018.01) | |
| *G06F 16/21* | (2019.01) | |
| *G06F 9/54* | (2006.01) | |
| *G06F 16/27* | (2019.01) | |
| *G06N 3/08* | (2006.01) | |
| *H04W 4/70* | (2018.01) | |

(52) U.S. Cl.
CPC ...... *G06F 11/3072* (2013.01); *G06F 11/3476* (2013.01); *G06F 16/212* (2019.01); *G06F 16/27* (2019.01); *G06F 16/904* (2019.01); *G06F 21/602* (2013.01); *G06F 21/645* (2013.01); *G06N 20/00* (2019.01); *G06Q 20/02* (2013.01); *G06Q 20/06* (2013.01); *G06Q 20/3827* (2013.01); *G06Q 20/405* (2013.01); *H04L 9/0643* (2013.01); *H04L 9/3236* (2013.01); *H04L 9/3239* (2013.01); *H04L 9/3242* (2013.01); *H04L 9/3247* (2013.01); *H04L 9/3265* (2013.01); *H04L 63/101* (2013.01); *H04L 63/102* (2013.01); *H04L 63/123* (2013.01); *G06N 3/08* (2013.01); *G06Q 2220/00* (2013.01); *H04L 2209/38* (2013.01); *H04L 2209/56* (2013.01); *H04W 4/70* (2018.02)

(56) References Cited

U.S. PATENT DOCUMENTS

| | | | | |
|---|---|---|---|---|
| 8,364,955 | B1* | 1/2013 | Sharma | G06F 21/6218 713/165 |
| 9,135,588 | B2* | 9/2015 | Nivala | G06Q 10/06 |
| 9,647,896 | B1* | 5/2017 | Mulder | H04L 41/22 |
| 10,084,762 | B2 | 9/2018 | Versteeg et al. | |
| 10,581,847 | B1* | 3/2020 | Sun | H04L 9/3239 |
| 2005/0071275 | A1* | 3/2005 | Vainstein | H04L 9/0822 705/51 |
| 2006/0248083 | A1* | 11/2006 | Sack | G06F 21/6218 |
| 2009/0083768 | A1 | 3/2009 | Hatalkar et al. | |
| 2012/0237022 | A1 | 9/2012 | Berson et al. | |
| 2015/0067154 | A1 | 3/2015 | Ly et al. | |
| 2016/0275526 | A1* | 9/2016 | Becanovic | G06F 16/48 |
| 2016/0292672 | A1 | 10/2016 | Fay et al. | |
| 2016/0300234 | A1* | 10/2016 | Moss-Pultz | G06Q 20/3827 |
| 2017/0005804 | A1 | 1/2017 | Zinder | |
| 2017/0041296 | A1 | 2/2017 | Ford et al. | |
| 2017/0046651 | A1 | 2/2017 | Lin et al. | |
| 2017/0124556 | A1 | 5/2017 | Seger, II | |
| 2017/0126702 | A1† | 5/2017 | Krishnamurthy | |
| 2017/0236094 | A1 | 8/2017 | Shah | |
| 2017/0352027 | A1 | 12/2017 | Zhang et al. | |
| 2017/0353309 | A1* | 12/2017 | Gray | G06F 21/51 |
| 2018/0005186 | A1† | 1/2018 | Hunn | |
| 2018/0025181 | A1* | 1/2018 | Barinov | G06F 21/645 726/26 |
| 2018/0039667 | A1 | 2/2018 | Pierce et al. | |
| 2018/0137465 | A1 | 5/2018 | Batra et al. | |
| 2018/0191502 | A1 | 7/2018 | Karame | |
| 2018/0191503 | A1 | 7/2018 | Alwar et al. | |
| 2018/0205555 | A1* | 7/2018 | Watanabe | G06Q 10/06 |
| 2018/0218003 | A1 | 8/2018 | Banga et al. | |
| 2018/0225448 | A1 | 8/2018 | Russinovich et al. | |
| 2018/0225640 | A1* | 8/2018 | Chapman | G06Q 20/0855 |
| 2018/0227116 | A1* | 8/2018 | Chapman | H04L 9/0643 |
| 2018/0260888 | A1* | 9/2018 | Paolini-Subramanya | H04L 9/3236 |
| 2018/0285971 | A1 | 10/2018 | Rosenoer | |
| 2018/0308072 | A1 | 10/2018 | Smith et al. | |
| 2018/0313798 | A1 | 11/2018 | Chokshi et al. | |
| 2018/0314809 | A1 | 11/2018 | Mintz et al. | |
| 2018/0315141 | A1 | 11/2018 | Hun et al. | |
| 2018/0315145 | A1 | 11/2018 | Darnell et al. | |
| 2018/0322587 | A1 | 11/2018 | Linne | |
| 2018/0330125 | A1 | 11/2018 | Gray | |
| 2019/0012249 | A1 | 1/2019 | Mercuri et al. | |
| 2019/0013932 | A1 | 1/2019 | Maino et al. | |
| 2019/0013933 | A1 | 1/2019 | Mercuri et al. | |
| 2019/0013948 | A1 | 1/2019 | Mercuri et al. | |
| 2019/0058592 | A1 | 2/2019 | Wright et al. | |
| 2019/0349733 | A1 | 11/2019 | Nolan et al. | |
| 2020/0311818 | A1 | 10/2020 | Miller et al. | |
| 2020/0322129 | A1 | 10/2020 | Wei et al. | |

OTHER PUBLICATIONS

"Non Final Office Action Issued in U.S. Appl. No. 15/995,078", dated May 14, 2020, 17 Pages.

"Non-Final Office Action Issued in U.S. Appl. No. 15/957,458", dated Feb. 21, 2020, 15 Pages.

"Non-Final Office Action Issued in U.S. Appl. No. 15/987,448", dated Mar. 16, 2020, 13 Pages.

"Convergent Encryption", Retrieved From: https://en.wikipedia.org/w/index.php?title=Convergent_encryption&oldid=659260002, Apr. 26, 2015, 2 Pages.

"Getting Smart: Contracts on The Blockchain", Retrieved From: https://www.iif.com/system/files/32370132_smartcontracts_report_may_2016_vf.pdf, May 2016, pp. 1-11.

Adams, Tori, "Blockchain, Smart Contracts, and Health: Booz Allen Hamilton and The Blockchain Revolution", Retrieved From: https://www.linkedin.com/pulse/blockchain-smart-contracts-health-booz-allen-hamilton-tori-adams, Dec. 11, 2015, 7 Pages.

Eufemio, et al., "Digix's Whitepaper: The Gold Standard in Crypto-Assets", Retrieved From: https://digix.global/whitepaper.pdf, Jan. 2016, 22 Pages.

Gantait, et al., "Implementing Blockchain for Cognitive IoT Applications, Part 2: Use Vehicle Sensor Data to Execute Smart Transactions in Blockchain", Retrieved From: https://www.ibm.com/developerworks/cloud/library/cl-blockchain-for-cognitive-iot-apps2/index.html, Jun. 5, 2017, pp. 1-17.

Hull, et al., "Towards a Shared Ledger Business Collaboration Language Based on Data-Aware Processes", In Proceedings of the International Conference on Service-Oriented Computing, Oct. 10, 2016, pp. 18-36.

Panikkar, et al., "ADEPT: An IoT Practitioner Perspective", Retrieved From: https://archive.org/stream/pdfy-esMcCOOdKmdo53-_/IBM%20ADEPT%20Practictioner%20Perspective%20-%20Pre%20Publication%20Draft%20-%207%20Jan%202015_djvu.txt, Jan. 7, 2015, pp. 1-18.

"International Search Report and Written Opinion Issued in PCT Application No. PCT/US2018/040077", dated Oct. 10, 2018, 16 Pages.

"International Search Report and Written Opinion Issued in PCT Application No. PCT/US2018/040087", dated Oct. 10, 2018, 14 Pages.

"International Search Report and Written Opinion Issued in PCT Application No. PCT/US2018/040096", dated Oct. 10, 2018, 16 Pages.

"International Search Report and Written Opinion Issued in PCT Application No. PCT/US2018/040103", dated Oct. 11, 2018, 14 Pages.

"International Search Report and Written Opinion Issued in PCT Application No. PCT/US2018/040108", dated Oct. 10, 2018, 16 Pages.

(56) References Cited

OTHER PUBLICATIONS

Weber, et al., "Untrusted Business Process Monitoring and Execution Using Blockchain", In Proceeding of the International Conference on Business Process Management, Sep. 18, 2016, pp. 329-347.
"Notice of Allowance Issued in U.S. Appl. No. 15/957,458", dated Sep. 3, 2020, 9 Pages.
"Final Office Action Issued in U.S. Appl. No. 15/995,078", dated Sep. 25, 2020, 18 Pages.
"Final Office Action Issued in U.S. Appl. No. 15/995,062", dated Oct. 29, 2020, 32 Pages.
"Final Office Action Issued in U.S. Appl. No. 15/987,448", dated Jul. 8, 2020, 13 Pages.
"Notice of Allowance Issued in U.S. Appl. No. 15/995,078", dated Mar. 31, 2021, 13 Pages.

\* cited by examiner
† cited by third party

BLOCKCHAIN PROOF OF CUSTODY, PROOF AGAINST TAMPERING, PROOF OF CHAIN OF CUSTODY

PRIORITY

This application claims the benefit of priority to U.S. Provisional Application Serial Number 62/530,081 having the title "SMARTLET MANAGER" filed Jul. 7, 2017, the disclosure of which is hereby incorporated by reference in its entirety.

TECHNICAL FIELD

The technology described herein relates to a computer system that interfaces with a blockchain to store data and interact with blocks on the blockchain.

BACKGROUND

Blockchain systems have been proposed for a variety of application scenarios, including applications in the financial industry, healthcare, emerging markets, and so forth. An early example of a blockchain was a cryptocurrency. The cryptocurrency was generated when new blocks were created on the blockchain to confirm transactions of the cryptocurrency. The new blocks may confirm the transfer of cryptocurrency generated in earlier blocks. The blocks on the blockchain were cryptographically proofed and linked to earlier blocks and served as an immutable record of the events in a trustless decentralized peer-to-peer network. For example, a cryptocurrency (e.g., bitcoin) is represented as a chain of events that transfers ownership from one party to another party on a blockchain without an intermediary. Each event transferring ownership from one party to another is cryptographically proofed by including the public key of the new owner. Also, each event is digitally signed with the current owner's private key.

A new block in a blockchain is filled with cryptographically proofed events until the block reaches a specified size limit. A hash digest of all the event identifiers within the block and the block header of the previous block are added as the first event in the block. Each block of events may be secured by a race between participants on a peer-to-peer network. In order to win the race the participants collect new events to create the new block, validate the events on the new block by verifying the cryptographic proofs of each event to verify the cryptocurrency was not spent earlier, and finally solve a mathematical puzzle based on the hash digest, previous block header and a random number. Blockchain provides a mathematical hierarchy of verifiable events that is immutable and is verified at each stage by the race between the participants. Other consensus protocols may be used to secure the blocks instead of the cryptographic race. Examples of consensus protocols include proof of work, proof of useful work, proof of stake, gossip about gossip and the like.

After blockchain was applied for cryptocurrency, the principles used in the early blockchain were modified to allow execution of smart contracts deployed on the blockchain. Smart Contracts are self-executing machine-readable instructions that can store state information and are stored on the blockchain. When deployed, the smart contract is assigned a unique address to allow communication to and from the smart contract through messages. The smart contract is deployed by storing the smart contract as an event on the blockchain (e.g., Ethereum™ blockchain). Messages to the smart contract may be posted as events on the blockchain. The smart contract may contain machine-readable instructions and data designed to execute on virtual machines. The smart contract may have the ability to read or write to its internal storage storing data, read the storage of a received message, send messages to other smart contracts to trigger execution of the code in other distributed applications. When the smart contract is executed on a virtual machine running on the peers securing the blockchain, the resulting data may be saved in the internal storage of the smart contract. The updated smart contract may be stored as an event on a new block. Thus, the smart contract and changes to data, i.e., state of the smart contract, are represented as a series of events on the blockchain. Similar to the cryptocurrency blockchain, each block in the blockchain by mining the blockchain by peers based on a consensus protocol.

For example, in a smart contract that governs a sale of an electronic asset, the smart contract may include machine-readable instructions to access its internal storage, machine-readable instructions to read the storage of a message sent to the smart contract and machine-readable instructions to process the data in a received message such as a counter-offer from a buyer. When the buyer sends a counter-offer to the smart contract, the smart contract may update its internal storage to include the counter-offer event, such as the identity of the buyer, the counter-offer price etc. The updated smart contract may be recorded as an event (e.g., a transaction) on a new block on the blockchain. In other words, the blockchain stores the changes in state of the smart contract as a series of events (e.g. a transaction). In an example, the blockchain may use a consensus algorithm that incentivizes peers to execute the smart contract in a virtual machine and record the changes to the internal storage in the smart contract, i.e., state of the smart contract to create new blocks.

The smart contract (e.g., a smart contract) may allow the administration and enforcement of some or all of the obligations and liabilities of the participants that may interact with the smart contract. One smart contract may use a second smart contract, called a utility smart contract, to provide a library of functions to other smart contracts. In an example, a utility smart contract may obtain updates on conditions that may affect the obligations and liabilities of the parties to the smart contract such as loan rates. However, smart contracts in a blockchain such as Ethereum™ ran on all peers involved in securing the events on the blockchain, increasing the cost of producing an immutable record of an event on the blockchain. Also, the smart contract in the blockchain may include code and data accessible to everyone by retrieving the blockchain.

Many blockchain implementations have emerged. There are currently over eighty different kinds of blockchains. Support for smart contracts varies in the different blockchains. Even among the blockchain implementations that support smart contracts, the available features vary.

Using smart contracts and the blockchain poses technical challenges for even the savviest participants. For example, the current block in the blockchain contains events that were received by a peer within a certain period. Therefore, the blocks may contain random events, without any other relationship to each other. Similarly, the events (e.g., a transaction) may relate to smart contracts or other smart contracts that are present in previous blocks in the blockchain. For example, the smart contracts may be identified by an identifying address or number, stored in a block of the blockchain. The smart contract may be packed into blocks optimized to meet block size limitations for retrieval. The smart contract stored on the block may be difficult to locate because of the lack of organization of the events recorded in each block. Also, different smart contract versions may be stored in multiple blocks, often on incompatible blockchain implementations (e.g., hard-forks). Similarly, events on the blockchain may be secured with cryptographic keys to interact with the smart contract.

Furthermore, blockchain enterprise applications are difficult to implement because they require knowledge of cryptography, knowledge of peer-to-peer systems, and knowledge of specialized languages used in blockchain smart contracts, which prevents people with enterprise expertise from building applications on the blockchain. Other technical issues associated with blockchains include interfacing an application on the blockchain to already existing technologies, such as reporting services, analytics, databases, data storage, artificial intelligence and the like.

BRIEF DESCRIPTION OF THE DRAWINGS

Features of the present disclosure are illustrated by way of example and not limited in the following Figure(s), in which like numerals indicate like elements, in which.

DETAILED DESCRIPTION

Figure 1:
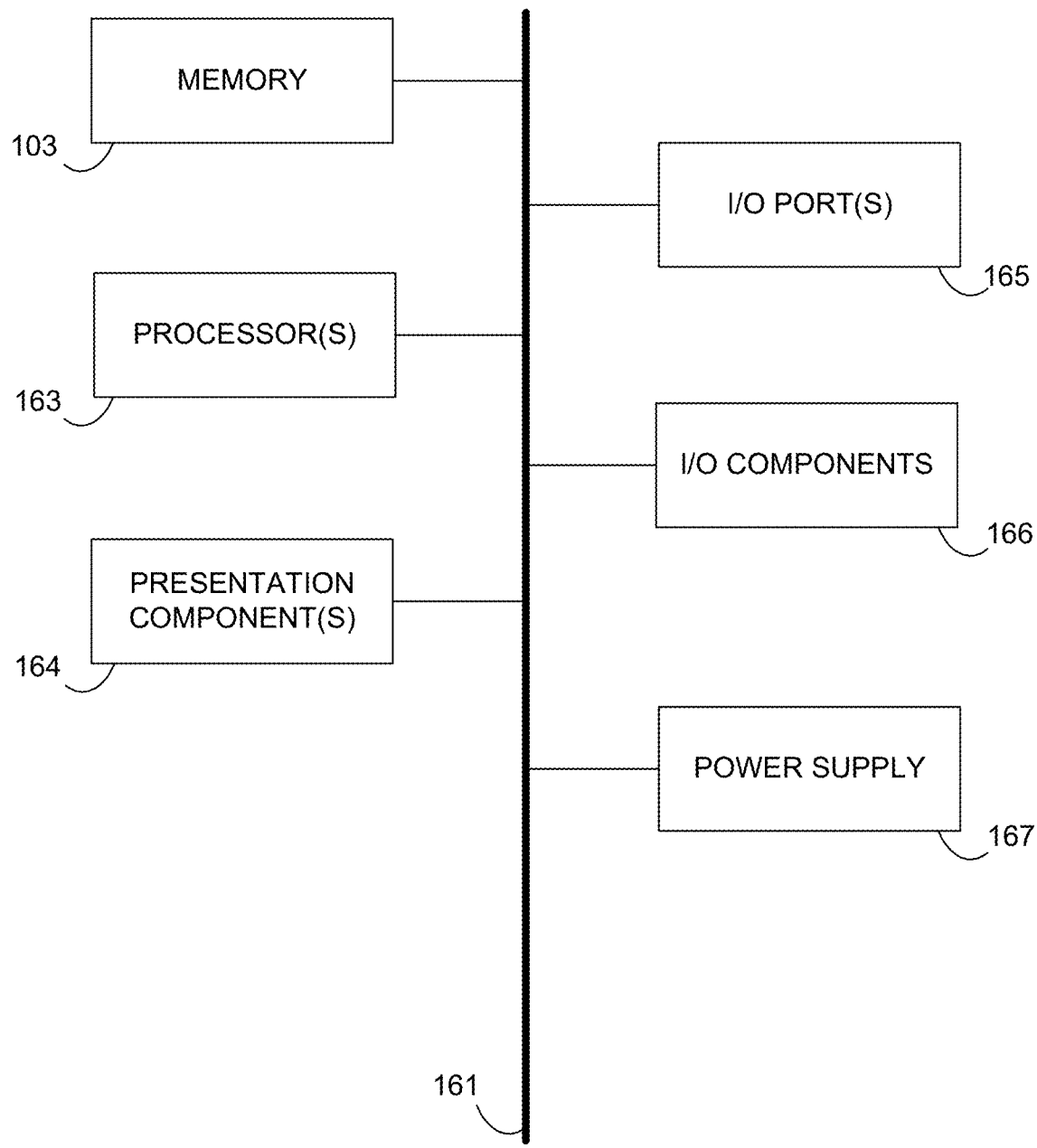
FIG. 1 illustrates an example of a computing environment for creating, deploying and managing a blockchain object, according to an embodiment of the present disclosure.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an embodiment of the present disclosure, an event interface system, hereinafter the system, provides a record storage system and facilitates a proof of custody, proof of chain of custody and proof against tampering for a record by deploying a hash of the record on the blockchain and storing the record on an off-chain storage. A record may be a digital record that memorializes activities performed, events occurred, results achieved, or statements made. Proof of custody may mean the record was created by a participant or equipment of a participant during the course of business and was stored in accordance with the defined process for the record. Proof of chain of custody may mean the record was accessed by participants who were authorized to access the record and/or each access to the record was documented. In an example, accessed may mean the record was read or updated.

For example, a record may be a digital copy of a police record, a video captured from the body camera of a police officer, records from a government office, records generated during the course of business of a private entity or the like. In an example, the record may include a file and a metadata associated with the file. The system may generate a hash of the record, deploy the hash to the blockchain and store the record in an off-chain storage.

In an example, the system may use a context schema to ensure the records stored during the normal course of business comply with the legal requirements and/or the policies. For example, the system may use the context schema to ensure a digital record such as a bodycam video of a police officer is stored in accordance with evidence laws governing foundation of evidence. The record may include the file (e.g., video file) and a metadata associated with the file. For example, the system may use the specifications in the configuration file to check the metadata or retrieve metadata.

For example, metadata may include calibration details of the body camera, the check in and check out time on the body camera, the participant (e.g., the police office) who checked out the body camera and the like. The metadata may also include details of additional participants such as technicians who worked on a crime scene to collect evidence, the tags attached to each piece of evidence, the time the evidence was tagged and the facility that processed the evidence, the person who received the tagged evidence at the facility and the like. The system may generate a hash of the record. In an example, the system may generate a hash of the digital file, store the digital file on an off-chain storage and store the hash on the blockchain contemporaneously to establish a proof of custody and proof against tampering. The system may also generate a hash of the metadata to establish a proof of chain of custody. The system may thus provide foundation for the evidence when presented in a legal proceeding by ensuring the record meets the standards necessary to establish a legal foundation for the evidence in a legal proceeding.

In an example, the system may deploy the blockchain object (e.g., hash) on the blockchain based on a context schema. The system is shown as system 100 in the figures and is further described below as the system 100.

A blockchain object may be a hash of a record stored in the off-chain storage. In another example, the blockchain object may be a smart contract deployed on a blockchain. In an example, the smart contract may be called a smartlet. In another example, the blockchain object may be a cryptlet that may be executed in a secure enclave instead of on all peers on the peer-to-peer network mining the blockchain to arrive at a consensus on the next block of the blockchain. In an example, a cryptlet is an off-chain machine-readable instruction, that executes within a secure, trusted container and communicated with using secure channels to provide additional functionality or information to one or more blockchain objects. The context schema may describe the constraints on interactions of a blockchain object. The blockchain object may be of two types, one with code capable of being executed on a node of a peer-to-peer network mining the blockchain, and one without code.

Examples of constraints may include state, persona, role, action, and parameters of an action associated with the blockchain object and the like. In an example, a blockchain object may be a smartlet that regulates an interaction between two or more participants for a specified objective. A participant may be a participant of the blockchain with a specific objective with respect to a blockchain object on the blockchain. An example of a specific objective may be a law enforcement officer complying with the foundational requirements of evidence, an employee at a private entity complying with the requirements of contracts and legal requirements, a government employee handling official records in accordance with the policies of digital records, a consortium of participants such as sustainable fishing organizations tracking produce and compliance with consortium standards and the like. The system may regulate an interaction with and to the record based on constraints around a record. In an example, the system may regulate an interaction with and to the record based on constraints defined in the context schema. The blockchain object may save an immutable record of the interaction on a new block on the blockchain.

The blockchain object deployed on the blockchain may be assigned a unique address. The unique address may be used to identify the blockchain object and to interact with the blockchain object.

The blockchain may receive events associated with the blockchain object from an event stack of the system in the form of messages addressed to the blockchain object's unique address. In an example, the system may deploy a message with an event associated with a first blockchain object on the blockchain by including a second blockchain object addressed to the prior blockchain object in a new block of the blockchain. For example, the system may generate an updated hash when a record is updated. The system may deploy the updated hash as second blockchain object addressed to the first blockchain object. For example, assume a record includes clinical trial information of a drug test on humans. The record may include a file with the medical history of a patient. The medical record may be updated throughout the clinical trial for the patient. The system may generate a hash of the medical record at the beginning of the trial, store the medial record in the off-chain storage, generate a hash of the medical record and deploy the hash as a first blockchain object on the blockchain. The system may then place a second blockchain object addressed to the first blockchain object where the second blockchain object is an updated hash that documents updates to the medical record. Thus, the system may produce an immutable record of the medical record of the patient.

In an example, the system may retrieve both the first blockchain object and the message (e.g., an update to a record, identify the configuration file associated with the first blockchain object, locate machine readable instructions on the system to implement the proof of custody, proof of chain of custody and/or the proof against tampering, and execute the machine-readable instructions and deploy the resulting blockchain object (e.g., updated hash) back to the blockchain. In an example, an event hub may receive an update to a patient record in a clinical trial. The event hub may identify the first blockchain object (e.g. hash) associated with the record. Determine an updated hash, store the updated hash as a second blockchain object on the blockchain. In an example, the system may use a secure enclave to receive confidential records such as the personal records of the patient and generate a hash of the patient record using machine readable instructions in the secure enclave.

In an example, the record may have restrictions or constraints on changes, access to the record and the like. In an example, the system may include machine readable instructions that enforce the constraints on a blockchain object. For example, the machine-readable instructions may enforce the proof of chain of custody requirements for records.

The event stack of the system provides an interface between events and the blockchain. For example, the event stack may deliver an event to the blockchain using one or more services. Events may include external events to the system and internal events generated in the system. For example, an internal service may generate periodic events. An example of an external event may be an update to a record or transmission of a birth, death or marriage received by the system. For example, a hospital may transmit information about a birth to the system. The event stack may queue events for processing by one or more system services. Examples of external events may include a weather report, a social media message, a message from an IoT device (e.g., measurements from IoT sensors), a record received during the normal course of business etc. In an example, a blockchain object may be used to monitor the state of perishable goods that are on route from a factory to a retail location. The event stack may receive events, such as measurements changes from IoT sensors monitoring the temperature of the perishable goods, and then trigger a change in the state of the blockchain object. For example, the system may post an updated hash of the record to the blockchain to track the change of state of the record. Examples of internal events may include an event generated by an internal service in the system. For example, a cryptlet in the system may generate an internal event periodically. In an example, the event may alter the state of the blockchain object.

For example, an update to the record may change its state by adding information to the record and/or deleting information from the record. The system may store both the states, i.e., the old record and the updated record to the off-chain storage and deploy hash of the old record and the updated record to the blockchain. Also, the system may provide an interface for monitoring and managing the state of a blockchain object by monitoring the blockchain updates on the blockchain.

In an example, the system may monitor the blockchain for a message blockchain object on a block update addressed to the blockchain object (e.g., hash). The hash may have a unique blockchain address on the blockchain. In an example, assume a consortium tracks sustainable fishing using the blockchain and hashes of a record tracking the fish from the sea to supermarket shelf. The fish on the supermarket shelf may have a tag or a bar code that may be scanned by a consumer using a mobile phone or other device. The system may receive an event with a request to authenticate the fish on the supermarket shelf. For example, the blockchain may include hashes of the record of the fish including when the fish was caught, the consortium participant (e.g., fisherman) who caught the fish, the consortium participant who handled the fish and the market the fish was shipped to and the like. The system may authenticate the chain of custody and inform the consumer and provide information about the fish. The use of the blockchain allows transparency in authenticating the chain of custody of the fish in the consortium promoting sustainable fishing.

The event stack may allow the system to process events in real-time. The event stack may queue events as the events arrive. The system may treat inputs received from outside the system as events and use the event stack to allow one or more services to process the events. In an example, the system may also treat inputs and outputs of services as events that may be processed by other services. The system may include one or more services that retrieve and process the events. Thus, the system (e.g., services of the system) may access the queued events to retrieve and process the events. For example, the system may allow integration of an enterprise banking system that can perform operations such as money transfers and loan approval processing with a blockchain object without any changes to the enterprise banking system.

The system may utilize a context schema to provide context to the logic (e.g., machine-readable instructions) or constraints on the record associated with the blockchain object for example to generate an application programming interface. The application programming interface may be used to allow interaction with the record through a webpage, mobile page or a bot and the like. In an example, the system may generate a user interface that allows a participant to interact with the record based on a context schema. The context schema may describe the specifications of the record and the associated blockchain object and constraints for interacting with the record. For example, a context schema may describe the current status of the record, the possible state transitions from the current state, the personas who may interact with the record, and the like. In an example, an instance of the context schema may be saved as a configuration file. Also, the configuration file may include details of the blockchain id the blockchain object is deployed on. For example, the blockchain object may be deployed on an Etherium™ blockchain. The blockchain id may be different for different blockchains or versions of the same blockchain. The configuration file may be specific to a record. The configuration file may be stored in the system and/or on the blockchain.

The user interface generated by the system allows a participant, such as a user or a system, to interact with the record and/or its associated blockchain object. For example, the system may generate different graphical user interfaces (GUIs) based on the current state of the record, the previous states of the record, future states, possible actions in the current state, possible actions based on the persona of the participant in the interaction, parameters of actions, and the like. The event stack receives events, such as participant interaction from the graphical user interface for processing by the services of the system. In an example, the system may store context schema values in a data repository (e.g., a database) in off-chain storage to store the contextual information. For example, the system may use the context schema to determine a persona type that is authorized to act on the record in its current state. For example, the persona type may be a participant in the sustainable fishing consortium authorized to process a fish caught by another participant in the fishing consortium. In an example, the context schema may describe a hierarchy of blockchain object, state, action, persona, role, and other contextual data along with the history of the event. In an example, the user interface may be a web browser application to receive interaction from participants of the blockchain. The system may receive the interactions of the participants with the web browser application at the event stack in the form of events.

For example, the system may receive events (from the participants) via the user interface. Examples of events received from the user interface may include a user interaction with a record in accordance with its context schema, a request to retrieve state information of a record and parameters of the record, and instructions or parameters for deploying a blockchain object. For example, to deploy the hash of the record, the system may receive a blockchain identifier indicating where a blockchain object (e.g., hash of the record) must be deployed from the user interface or may retrieve the blockchain identifier from off-chain storage as an internal event. In an example, a cryptlet may retrieve this information from the off-chain storage. The system may process the received events to determine the interaction between a participant and a blockchain object. The system may deploy the hash of the record as a blockchain object to the blockchain. The system may also monitor a blockchain object on the blockchain, and store and provide information regarding updates to the blockchain object.

The system according to an example may allow authentication of participants using a simplified login with a username and password. The system may match the off-chain identity of the participant with the blockchain identity of the participant. For example, the blockchain identity of a participant may be a public key, private key pair stored in a key vault. The system may provide services such as a signing service that transparently integrates the off-chain identity of the participant with the blockchain identity of the participant. For example, the system may allow a participant to deploy the hash of the record as a blockchain object to the blockchain by automating the signing procedure for blockchain objects before deploying the blockchain object using the appropriate private key pair and public key pair. In an example, the system may allow authorized participants to deploy the hash of the record on the blockchain. For example, an organization such as the police department may authorize an evidence room clerk to access and store body camera footage. The system may determine whether the record is created with the appropriate authorizations. For example, the system may track all access to body camera files. In an example, the body camera footage may be encrypted and may only be accessed by the authorized participant. The system may abstract the proof of custody, proof of chain of custody and the proof against tampering from the participant. For example, the system 100 may abstract the authentication of the participant, verification of authorization and the deployment process for a blockchain object (e.g., hash) before deployment. For example, the system may present the authorized participant with a normal entry screen with GUI familiar to the participant to receive and present information. For example, the GUI may prove details of the blockchain object such as the asset description, location of the asset, participants who accessed or created the asset, time of creation, the chain of custody details and the like. In addition, the system may present an action list of actions for the authorized participant, such as to approve deployment of the hash or disapprove deployment of the hash. The system may link the off-chain identity of the participant with the blockchain identity of the participant, and retrieve the appropriate keys, initialize the blockchain object (e.g., hash of asset with or without metadata) with the appropriate parameters, request for missing parameters, sign the blockchain object with the appropriate cryptographic signature and deploy the blockchain object (e.g., hash). The system may also store the record in the off-chain storage.

Referring to the drawings in general, and initially to FIG. 1 in particular, an operating environment for the event interface system 100 (also referred to as the system 100). The operating environment for the system 100 is illustrated generally as computing device 101. Computing device 101 is but one example of a suitable operating environment and is not intended to suggest any limitation as to the scope of use or functionality of the disclosure. Neither should computing device 101 be interpreted as having any dependency or requirement relating to any one or combination of components illustrated. FIG. 3 below describes one example of the computing device 101. FIG. 3 includes components designed using the cloud architecture described in FIG. 2.

Components of the system 100 may be described and implemented in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Examples of the disclosure may be practiced in a variety of system configurations, including handheld devices, consumer electronics, general-purpose computers, specialty computing devices, etc. Aspects of the disclosure may also be practiced in distributed computing environments where tasks are performed by remote-processing devices that are linked through a communications network.

With continued reference to FIG. 1, computing device 101 includes a bus 161 that directly or indirectly couples the following devices: memory 103, one or more processors 163, one or more presentation components 164, input/output (I/O) ports 165, I/O components 166, and an illustrative power supply 167. Bus 161 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Recognizing that such is the nature of the art, the diagram of FIG. 1 is merely illustrative of an example of a computing device that can be used in connection with one or more examples of the present disclosure. Distinction is not made between such categories as "workstation," "server," "laptop," "handheld device," etc., as all are contemplated within the scope of FIG. 1 and reference to "computer" or "computing device."

Computing device 101 typically includes a variety of non-transitory computer readable media. By way of example, and not limitation, computer readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 101. Computer storage media does not, however, include propagated signals. Rather, computer storage media excludes propagated signals. Any such computer storage media may be part of computing device 101.

Memory 103 includes computer storage media in the form of volatile and/or nonvolatile memory. The memory may be removable, non-removable, or a combination thereof. Examples of hardware devices include solid-state memory, hard drives, optical-disc drives, etc. Processors 163 read data from various entities such as memory 103 or I/O components 166. Memory 103 stores, among other data, one or more applications. The applications, when executed by the one or more processors, operate to perform functionality on the computing device. The applications may communicate with counterpart applications or services such as web services accessible via a network (not shown). For example, the applications may represent downloaded client-side applications that correspond to server-side services executing in a cloud. In some examples, aspects of the disclosure may distribute an application across a computing system, with server-side services executing in a cloud based on input and/or interaction received at client-side instances of the application. In other examples, application instances may be configured to communicate with data sources and other computing resources in a cloud during runtime, such as communicating with a cluster manager or health manager during a monitored upgrade or may share and/or aggregate data between client-side services and cloud services.

Presentation component(s) 164 present data indications to a participant or other device. Examples of presentation components include a display device, speaker, printing component, vibrating component, etc. I/O ports 165 allow computing device 101 to be logically coupled to other devices including I/O components 166, some of which may be buser interfaceIt in. Illustrative components include a microphone, joystick, game pad, satellite dish, scanner, printer, wireless device, etc.

Figure 2:
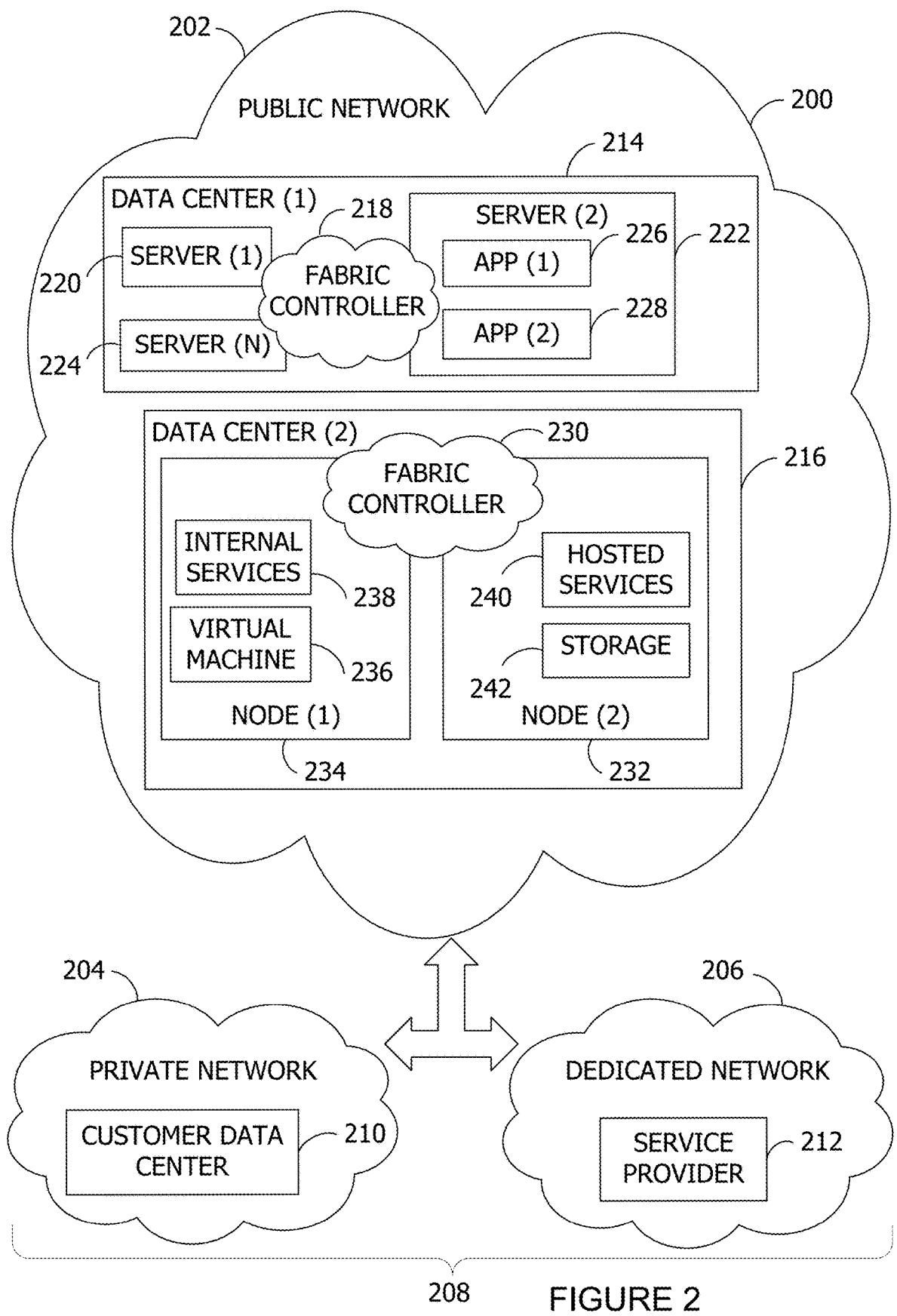
FIG. 2 shows an example of cloud system components that may be used to build an event interface system for blockchain objects, according to an embodiment of the present disclosure.
Figure 3:
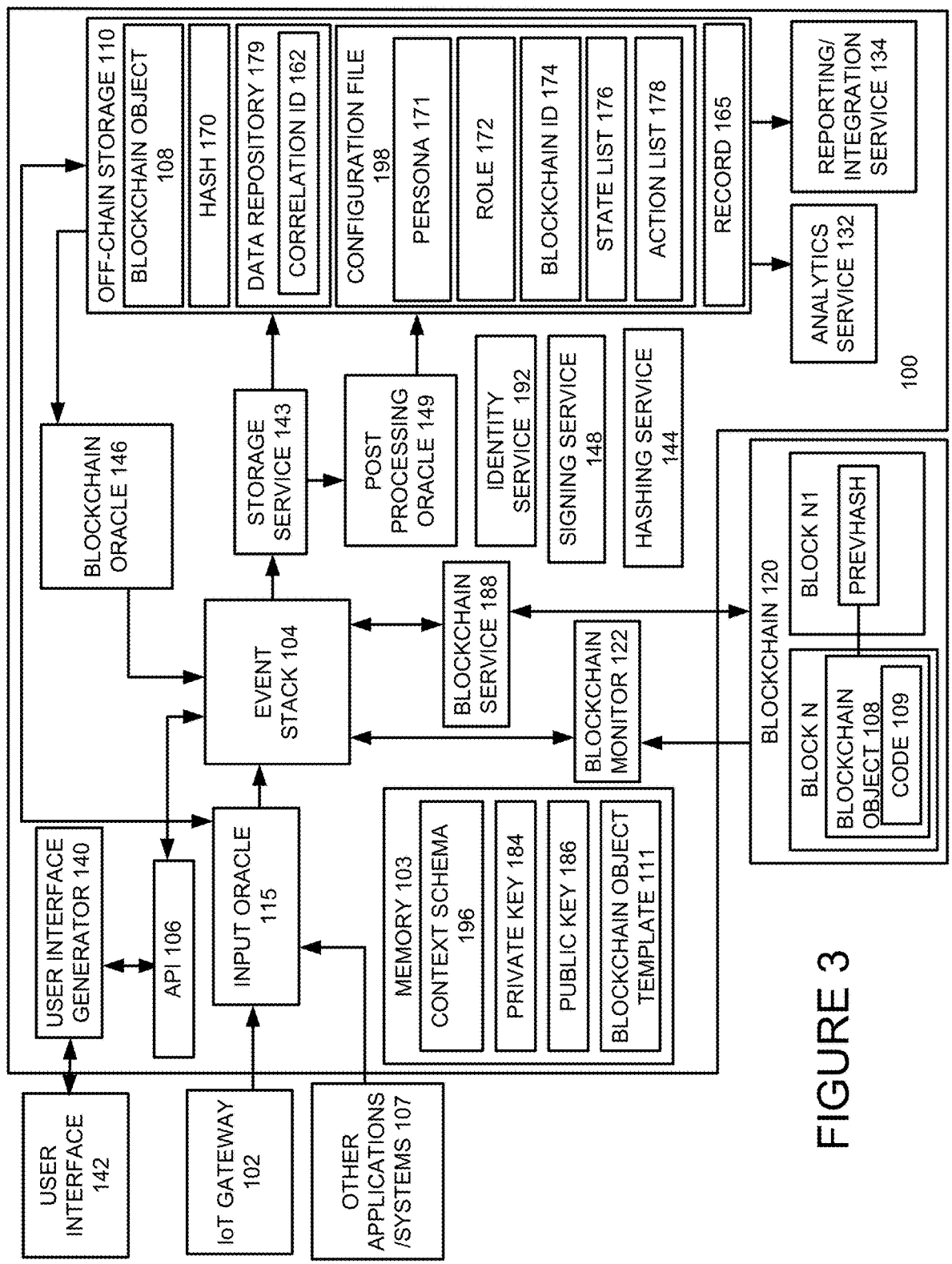
FIG. 3 illustrates a system diagram of an event interface system for creating, deploying and managing a blockchain object, according to an embodiment of the present disclosure.

FIG. 2 shows an example of an architecture 200 of a cloud computing environment for one or more components of the system 100 (described in detail in FIG. 3). The one or more components of the system 100 may use one or more components shown in FIG. 2 to create one or more services described in further detail in FIG. 3. The one or more services of the system 100 may generate a blockchain object, deploy a blockchain object, interface with a blockchain object and manage a blockchain object. Also, the system 100 may be used to implement a record storage system that provides a proof of custody, proof of chain of custody and proof against tampering for records. Architecture 200 should not be interpreted as having any dependency or requirement related to any single component or combination of components illustrated therein. Also, any number of nodes, virtual machines, data centers, role instances, or combinations thereof may be employed to achieve the desired functionality within the scope of embodiments of the present disclosure.

The distributed computing environment of FIG. 2 includes a public network 202, a private network 204, and a dedicated network 206. Public network 202 may be a public cloud, for example. Private network 204 may be a private enterprise network or private cloud, while dedicated network 206 may be a third party network or dedicated cloud. In this example, private network 204 may host a customer data center 210, and dedicated network 206 may host an internet service provider 212. Hybrid cloud 208 may include any combination of public network 202, private network 204, and dedicated network 206. For example, dedicated network 206 may be optional, with hybrid cloud 208 comprised of public network 202 and private network 204.

Public network 202 may include data centers configured to host and support operations, including tasks of a generating, deploying, interfacing, and managing the blockchain object, according to embodiments of the current disclosure. It may be understood and appreciated that data center 214 and data center 216 shown in FIG. 2 an example of one implementation for accommodating one or more applications and is not intended to suggest any limitation as to the scope of use or functionality of embodiments of the present disclosure. Neither should data center 214 and data center 216 be interpreted as having any dependency or requser interfacerement related to any single resource, combination of resources, combination of servers (e.g., server 220, server 222, and server 224) combination of nodes (e.g., nodes 232 and 234), or set of APIs to access the resources, servers, and/or nodes.

Data center 214 illustrates a data center comprising a plurality of servers, such as server 220, server 222, and server 224. A fabric controller 218 is responsible for automatically managing the servers and distributing tasks and other resources within the data center 214. By way of example, the fabric controller 218 may rely on a service model (e.g., designed by a customer that owns the modular-application) to provide guser interfacedance on how, where, and when to configure server 222 and how, where, and when to place application 226 and application 228 thereon. In one embodiment, one or more role instances of a modular-application may be placed on one or more of the servers of data center 214, where the one or more role instances may represent the portions of software, component programs, or instances of roles that participate in the blockchain object application manager application. In another embodiment, one or more of the role instances may represent stored data that is accessible to the blockchain object application manager.

Data center 216 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative embodiments of the disclosure. Generally, virtual machine 236 is allocated to role instances of a modular-application, or service application, based on demands (e.g., amount of processing load) placed on the modular-application. As used herein, the phrase "virtual machine" is not meant to be limiting, and may refer to any software, application, operating system, or program that is executed by a processing unit to underlie the functionality of the role instances allocated thereto. Further, the virtual machine 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of the data center 216 and for placing the role instances and other resources (e.g., software components) within the data center 216. By way of example, the fabric controller 230 may rely on a service model (e.g., designed by a customer that owns the service application) to provide user interface on how, where, and when to configure the virtual machines, such as virtual machine 236, and how, where, and when to place the role instances thereon.

As discussed above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, server(s), and the like. In one instance, the nodes host and support the operations of the virtual machines, while simultaneously hosting other virtual machines carved out for supporting other tenants of the data center 216, such as internal services 238 and hosted services 240. Often, the role instances may include endpoints of distinct service applications owned by different customers.

Typically, each of the nodes includes, or is linked to, some form of a computing unit (e.g., a central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer readable medium (e.g., computer storage media and communication media) accommodated by each of the nodes.

The role instances that reside on the nodes support the operation of service applications and may be interconnected via application programming interfaces (APIs). In one instance, one or more of these interconnections may be established via a network cloud, such as public network 202. The network cloud serves to interconnect resources, such as the role instances, which may be distributable placed across various physical hosts, such as nodes 232 and 234. Also, the network cloud facilitates communication over channels connecting the role instances of the service applications running in the data center 216. By way of example, the network cloud may include, without limitation, one or more local area networks (LANs) and/or wide area networks (WANs). Such networking environments are commonplace in offices, enterprise-wide computer networks, intranets, and the internet. Accordingly, the network is not further described herein.

With reference to FIG. 3, there is shown the system 100 that may create, deploy and manage a blockchain object, according to an embodiment. In an example, the system may provide a record storage system that facilitates a proof of custody, proof of chain of custody and a proof against tampering for a record. For example, FIG. 3 shows a record 165 and the corresponding hash of the record stored as a blockchain object 108. The system 100 may generate a hash of the record 165 and may deploy the hash on a blockchain 120 by the system 100. In an example, the system 100 may receive a record through the user interface 142. As is further discussed below, the system 100 may also serve as an interface between an event, which may be received and queued for processing in an event stack 104, and the blockchain 120. The system 100 may also facilitate and control interactions with the blockchain object 108 by a participant or another system attempting to interact with the blockchain object 108. For example, the blockchain object 108 may be accessed by a participant to verify the proof of chain of custody of the record 165. In an example, a message addressed to the blockchain object 108 may request authentication of a participant in relation to a record. The system 100 may then respond with a message blockchain object in the next block update. Also, the system 100 allows services, which may be incorporated in the system 100, to process events and other information pertaining to the blockchain object 108. A service may refer to a software functionality or a set of software functionalities that different systems or users or other software functionalities can reuse and may include policies that control its usage. It should be understood that the system 100 may include additional components other than shown and that one or more of the components described herein may be removed and/or modified without departing from a scope of the system 100.

The event stack 104 queues one or more events. For example, the event stack 104 may be a service on a cloud platform using some or all of the components described in FIG. 2 to receive data from multiple sources and queue the data for other services in the system 100 to further process. In an example, the event stack 104 may receive large streams of data and include a scalable data streaming platform and event ingestion service capable of receiving and processing millions of events per second. Examples of these type of events received at the event stack 104 may include data from an entity such as records generated during the normal course of business, data from IoT sensors received via an IoT gateway 102 or data from real-time social media feeds. Other types of events may include user interactions received via user interface 142, events received from other applications systems 107, events received from blockchain 120, and events received from an off-chain storage 110. The event stack 104 may receive feeds from various sources. For example, the event stack 104 may receive a Twitter™ firehose feed of all Twitter™ notifications. In an example, the event stack 104 stores events in the order in which the events were received to allow one or more services, blockchain oracles or cryptlets, which are further described below, to process the events. The event stack 104 may receive events through a network.

In the system 100, cryptlets or oracles may be used to enable the processing of events on the event stack or for processing data generally on the system 100 or for processing events received from the blockchain and any source of events internal to the system 100 or external to the system 100. Cryptlets and oracles may include machine-readable instructions that may be executed on the blockchain or in secure enclaves outside the blockchain. The cryptlets and oracles may execute their machine-readable instruction in a secure enclave where the data is protected during execution of the code. In an example, components 115, 146 and 149 of the system 100 may be embodied as a cryptlet or an oracle. The system 100, may use cryptlets or oracles to perform the services provide by the input oracle 115, blockchain oracle 146 and the post processing service 149 or other services.

The system 100 may include an input service 115 to receive events, such as real-time events, messages from an IoT gateway 152, and events from other applications or systems 107. In an example, the input service 115 may process events received from external sources before sending the events to the event stack 104. In an example, the input service 115 may deploy the received events (e.g., updates to the record) as messages addressed to a blockchain object on blockchains 120. In an example, the message may be a second blockchain object addressed at a first blockchain object on the blockchain 120.

The event stack 104 may also interface with an Application Programming Interface (API) 106 that invokes generating a user interface 142 through a user interface generator 140. The user interface generator 140 may generate the user interface 142 to receive interactions from a participant. The system 100 may treat the interaction received from the participant as an event. In an example, the user interface 142 may be generated on a remote computer. The user interface 142 may be displayed on a screen in a web browser. The user interface generator 140 may queue events received from participants via the user interface 142 in the event stack 104 through the API 106.

Also, the input service 115 may receive an event (e.g., the record) from other systems. For example, the input service 115 may receive an event from other application systems 107. The input service 115 may also retrieve events from off-chain storage 110 and other services, as is further discussed below.

In an example, the API 106 may allow the system 100 to receive an event (e.g., the record) at the event stack 104 from the user interface 142. The events may in examples identify a participant (e.g., a participant), provide authorization to interact with a blockchain object, identify a list of currently associated blockchain objects, generate new blockchain objects, provide documents for hashing, uploading to a blockchain, provide documents for storage on the off-chain storage 110, details of a blockchain object such as owner, the participants allowed to interact, offer price, etc. Although the user interaction is described with reference to the user interface 142, the system 100 may receive events from a participant through the command line, a holographic interface, a voice recognition system, from other systems 107 and the like.

In an example, the input service 115 in association with the API 106 may provide an interface to websites, mobile devices, and other systems to allow access to the blockchain 120 and/or the blockchain object 108. The system 100 may thus provide a service that may allow interaction between the blockchain 120 and participants using the API. For example, a mobile application may use the API to allow participants access to the blockchain 120.

Examples of services that may process the events queued by the event stack 104 may include a storage service 143, a blockchain service 188, a blockchain monitor 122, an analytics service 132, an integration service 134, etc., which are further discussed below. Also, the system 100 may process events, and determine whether to alter the state of blockchain object 108X and/or 108Y based on the events, as is further discussed below.

The storage service 143 may store the event (e.g., the record 165) in off-chain storage 110 and deploy the hash of the event to the blockchain 120. Off-chain storage 110 refers to storage outside the blockchain 120. Examples of the off-chain storage 110 include databases, cloud storage services, data lakes, and the like. In an example, the system 100 may store events locally on a hard drive, and the storage service 143 may process the events before storing the events in the off-chain storage 110. In an example, the system 100 may use a post processing service 149 to process events before storing the events in the off-chain storage 110.

The storage service 143 may maintain a synchronized version of events that corresponds to hashes deployed on the blockchain 120 in the off-chain storage 110. For example, the storage service 143 may generate a hash of a new event (e.g., an update to the record 165) received at the event stack 104 and store the event and the hash (e.g., the blockchain object 108) in the off-chain storage 110. The storage service 143 may generate a hash of each blockchain object on the blockchain 120 when new objects are added to blockchain 120. The hashing service 144 may use a SHA (Secure Hashing Algorithm) or any suitable cryptographic function to generate a hash of an input, such as an event. The hashing service 144 may be used to hash an event, such as the record 165 before the blockchain object (e.g. hash of the record 165) is deployed on the blockchain 120.

In an example, the storage service 143 may store information on the off-chain storage 110 that may not be placed on blockchain due to the immutability of blockchain 120. For example, the personally identifiable information may be stored in the off-chain storage 110. Also, the record 165 may be stored in the off-chain storage 110. The system 100 may provide access to the record 165 to authorized participants based on the configuration file.

The event stack 104 may also receive an event from the blockchain monitor 122. For example, the blockchain monitor 122 monitors block updates, i.e., blocks as they are added to blockchain 120. A block update may be a new block. The blocks may include events such as blockchain objects on the blockchain 120. The blockchain monitor 122 may retrieve a new block after it is posted to blockchain 120, identify a plurality of events in a block update (i.e., a new block) in the blockchain, and queue the plurality of events on the event stack 104 for processing. In an example, the blockchain monitor 122 may monitor the blockchain 120 generated on a peer-to-peer network of nodes mining the blockchain 120 to generate a consensus on the new block with blockchain objects external to the system 100. The blockchain monitor 122 may receive a new block on the blockchain 120 published by a node of the peer-to-peer network external to the system 100. The peer may publish the new block after the node generates the new block based on a consensus protocol of the blockchain 120. Examples of consensus protocols for the blockchain 120 may include proof of work, proof of stake, gossip about gossip or the like. The blockchain monitor 122 may identify blockchain objects on the new block. In an example, the blockchain monitor 122 may generate an event for each blockchain object on the new block. Events may be queued on the event stack 104 from the blockchain monitor 122. The events may also be stored in the off-chain storage 110 by the storage service 143 as described above.

The event stack 104 may also interface with a blockchain service 188 that writes events (e.g., hash of the record) to the blockchain 120. The blockchain service 188 may allow the system 100 to deploy selected events from the event stack 104 to the blockchain 120. For example, the system 100 may receive an event (e.g., the record or an update to the record from a participant) through the user interface 142. The system 100 may generate a hash of the record or the update to the record and deploy the hash as the blockchain object 108. The blockchain service 188 may then transmit the blockchain object 108 to a node on a peer-to-peer network of nodes mining the blockchain 120. The node may then generate a new block for the blockchain 120 based on the consensus protocol of the blockchain 120. As described above, the storage service 143 may also store the record or the update to the record in the off-chain storage 110. The storage service 143 may also store hash 170 of the blockchain object 108 in the storage service 143.

The storage of events on off-chain storage 110 allows analytics services 132 and reporting and integration service 134 to use the data without additional steps to obtain blockchain object data from the blockchain 120. Examples of the analytics service 132 may include Azure™ Data Lake analytics, Azure™ Stream Analytics, machine learning analytics and the like. Also, the off-chain storage 110 augments the blockchain object 108 with contextual information about the blockchain object 108 not available on the blockchain 120. The contextual detail is available to services on the system 100 including services that are blockchain agnostic using the configuration file 198, which describes relationships between users, their roles, actions available to them, parameters of the blockchain object and the like. The reporting/integration service 134 may allow integration of the blockchain objects stored in the off-chain storage 110, the contextual details augmented by the configuration file 198 and a data repository 179 storing the values of the contextual information in accordance with the type information in the configuration file 198 with services that are not blockchain aware. The services that are not blockchain aware may access the events from the blockchain 120 from the data repository 179 storing all the values along with contextual information.

As discussed above, the system 100 may use the blockchain service 188 to deploy the blockchain object 108 to the blockchain 120. The system 100 may use the identity service 192 to determine the signing key for a participant and the signing service 148 to cryptographically sign the blockchain object 108 before deploying the blockchain object 108 to the blockchain 120. The cryptographic signature of the blockchain object 108 may be the signature of blockchain object 108 generated using the private key 184 of a participant. Each object on the blockchain 120 may be cryptographically signed using the private key of one or more participants that create or interact with the blockchain object 108. In an example, a participant may generate an event (e.g., a message addressed to the blockchain object 108) and deploy the event to the blockchain 120 to interact with the blockchain object 108. The system 100 may receive the message and process the message. The system 100 may post a blockchain object such as an updated hash to the blockchain 120. The peer on the peer-to-peer network may publish the updated hash on a new block of the blockchain 120. If needed, the cryptographic signature of the participant who deployed the blockchain object 108 may be retrieved from a previous block of the blockchain 120. The cryptographic signature of the message may be detected from the message by examining the signature on the message and identifying the public key using the asymmetric property of cryptographic signatures. In an example, the system 100 may access a public database holding the public keys, associated names and email address of the participant to retrieve the off-chain identity based on the blockchain identity. For example, the system 100 stores, in memory 103, a private key 184 and a public key 186 of a particular participant interacting with the system 100. In an example, the message blockchain object may be signed using the private key 184 of the participant. Thus, the system 100 can authenticate message blockchain object using the cryptographic function. Memory 103 is shown by way of example as a storage device that may store information for the system 100, including cryptographic keys and other information, but other types of storage may be used as well.

The input service 115 may process an event and place the event on the event stack 104 for deployment to the blockchain 120 through the blockchain service 188. In an example, the system 100 may use the hashing service 144, the signing service 148 or both to securely encrypt the confirmation message with the public key 186 of the participant to confirm receipt of consideration.

The system 100 may use the signing service 148 to sign a blockchain object (e.g. a hash of the record), for example, using the private key 184 and the public key 186 from the memory 103. The system 100 may then deploy the blockchain object through the blockchain service 188.

The identity service 192 may reduce the complexity of interacting with the blockchain 120 for a participant using the system 100 by associating an off-chain identify of the participant with a blockchain identity of the participant. In an example, the off-chain identity of the participant may be the first name and last name of the participant, the job title, the role, the organization unit, email address, phone number and the like of the participant in an organization. In another example, the participant may be a private individual identified by his role, email address, phone number and the like. The blockchain identity of the participant may be the private key 184 and the public key 186 of the participant. The identity service 192 may store the off-chain identity and the off-chain identity of the participant in the off-chain storage 110. In an example, the identity service 192 may generate metadata information in the off-chain storage 110 that maps the off-chain identity of the participant with the on-chain identity of the participant for the record 165. For example, the configuration file 198 may include definitions of the different roles within a specific context in the record 165 and/or its associated blockchain object 108. The identity service 192 may use the role information in the configuration file 198 for the record 165 and the context such as when the role is enabled for the record 165 to map the public identity and the private identity of the participant in the off-chain storage 110. In an example, the identity service 192 may store the mapping in the data repository 179 in the off-chain storage 110.

For example, assume a first participant works for a company engaged in sustainable fishing and a second participant works for a shipping service shipping the fish. The company engaged in sustainable fishing and the company engaged in shipping the fish may be part of a consortium that uses the system 100 and the blockchain 120. The first participant and the second participant may be invited to join the consortium using their existing credentials. For example, the existing credentials may be their email address issued by the company they represent. In an example, the system 100 may allow the first participant and the second participant to login using the credentials such as email address of the entity they represent. The system 100 may enforce authentication policies of the company engaged in sustainable fishing on the first participant. Also, the system 100 may enforce the authentication policies of the company engaged in shipping the fish on the second participant. For example, an authentication policy of the company may require a participant to use two factor authentications.

In an example, the participant may log into the system 100 with an email address, which may be the participant's username. In an example, the system 100 may use a protocol such as the oAuth to authenticate the participant and receive a token that may be used to authenticate the participant a session. For example, the protocol may authenticate the participant using the Azure Active Directory service associated with the company of the participant. For example, for the first participant the system 100 may use the Azure Active Directory service of the first participant to authenticate the participant and to determine a token to authenticate the participant during the session.

In an example, during the first interaction with the system 100, the system 100 may generate a blockchain identity of the participant such as the private key 184 and the public key 186. In an example, the blockchain identity of the participant may be an address on the blockchain 120 (e.g., Etherium™ blockchain). The system 100 may allow the participant to interact with the blockchain 120 using the token. The token may allow the system 100 to map the participant's off-chain identity to the blockchain identity of the participant using the metadata stored in the data repository 179. Also, the system 100 may assign roles to the participant to allow access to the record 165. For example, a manager in a company engaged in sustainable fishing may be identified as the owner and/or source of the fish. The system 100 may allow the owner to deploy a hash of the record 165 as the blockchain object 108 to track a fish on the blockchain 120.

In an example, the identity service 192 may query the data repository 179 to determine contextual details of the participant, such as the participant's first name and last name, role 172 in the organization, persona 171 in the blockchain objects associated with the participant, and events associated with the participant. In an example, the system 100 may store the information in the data repository 179 using the configuration file 198. The metadata in the data repository 179 may allow the system 100 to identify the appropriate fields to populate, to index the contextual information for easy retrieval, and to provide a data repository that may be used by other services to seamlessly access the record 165 and associated objects. The contextual information in the data repository 179 may include information about the participant that may identify the participant to the system 100 and other participant interacting with the participant. For example, the contextual information about the participants may allow the system 100 to display the first and last name of one or more participants that interacted with the blockchain object 108 when the record 165 is presented on the user interface 142. For example, the participant (e.g., the first participant engaged in sustainable fishing) may be shown the first and last name, and an option to contact the LEO 302, the detective 306 and the like based on the contextual information.

In an example, the system 100 may allow use the off-chain identity to compartmentalize access to the information. For example, the system 100 may allow the participant to access the record 165 based on the role of the participant stored in the metadata on the data repository 179. In another example, the system 100 may restrict access to the participant based on the state of the record 165 and/or the blockchain object 108. For example, assume the second participant may access blockchain object only after the fish in the sustainable fishing example described above has been processed. The system 100 may enforce these access controls based on the metadata in the data repository 179 mapping the participants roles to the participant's blockchain identity. For example, in the Etherium™ blockchain, blockchain object 108 may be a smart contract. The smart contract may have restrictions on who may interact with the record 165. The system 100 may use the mapping in the data repository 179 to identify the participant, obtain contextual information about the role of the participant and allow the participant to interact only when the role of the participant matches the restrictions imposed by the record 165 on the role of the participant. For example, in a smart contract written in Solidity language and targeted for the Ethereum blockchain, code generation could deliver Modifier functions that implemented role-based access control to certain functions within the contract.

In an example, the system 100 may receive contextual details of the participant through the user interface 142. Also, the identity service 192 may also link the off-chain identity and the blockchain identity of the participant by storing these details in the data repository 179. For example, the identity service 192 may map the participant's off-chain identity with the blockchain identity on the data repository 179. In an example, identity service 192 may store the metadata such as the mapping of the off-chain identity and the on-chain identity to the participant's blockchain identity such as the participant's private key 184 and public key 186. In an example the participant's off-chain identity may be a user specific ID that is associated with one or more external ids. For example, an id that maps to the Azure Active Directory, a mac address for a device, an active directory service on a machine or the like. Based on the stored metadata, the system 100 can determine when the off-chain identity and the blockchain identity of the participant match by retrieving the mapping information from the metadata store and verifying the information in order to facilitate interactions with a deployed blockchain object. Also, the identity service 192 may use the metadata in the data repository 179 linking the real-world identity and the blockchain identity (e.g., in the data repository 179 with the two fields) to remove the participant from the system 100 and revoke access to the blockchain 120. For example, the system 100 may remove a participant who is no longer authorized to interact with the blockchain 120 on behalf of the company in a consortium.

The signing service 148 may use the private key 184 of the participant to sign the hash of the record 165, and the blockchain service 188 deploys the signed blockchain object 108 (e.g., hash of the record 165) on the blockchain 120. The identity service 192 or another component of the system 100 may determine whether the participant with a particular off-chain identity is authorized to deploy the blockchain object 108. For example, the system 100 may use context schema 196 to determine persona 171 of the participant, and the system 100 may determine whether the participant is allowed to deploy a blockchain object based on the persona 171 and/or role 172 of the participant.

In an example, the system 100 may use the identity service 192 to authenticate the identity of a participant on the blockchain 120. For example, after the blockchain object 108 is deployed on the blockchain 120, the system 100 may receive an event from the blockchain 120 that requests authentication of the record 165 or verification of the identity of a participant. The system 100 may receive the event from the blockchain 120 through the blockchain monitor 122. The event includes the cryptographic signature of a participant associated with the event, which may be provided in a message blockchain object addressed to the blockchain object 108 from the participant. The system 100 may use the cryptographic signature of the participant from the event to identify the off-chain identity of the participant. For example, the system 100 may use a username and password for the participant to authenticate the participant and associate the participant's blockchain identity with the participant's off-chain identity. The system 100 may support other authentication schemes over the network such as oAuth protocol and the like.

The memory 103 may store the context schema 196, the private key 184, the public key 186 and blockchain object template 111. In an example, the context schema 196 may include a parameter specification of the blockchain object 108. The parameter specification may include parameters or variables that describe who may interact with the blockchain object, when they may interact, how they may interact, what are the parameters of the interaction, the purpose of the interaction and the like. The parameters may include acceptable types for the information. The context schema 196 may describe a hierarchy of a blockchain object, state, action, persona, role, and other contextual details. The system 100 may create an instance of the context schema 196, i.e., configuration file 198. For example, the configuration file 198 as shown inherits the hierarchy of the state list 176 containing the actions from the action list 178 in each state of the state list 176 and the actions from the action list 178 including the personas 171 who may perform the action and the parameters 175 of the actions. For example, the system 100 can populate the data repository 179 with values of the parameters, states, actions, personas etc., described in the configuration file 198. In an example, the system 100 may generate a customized instance of the context schema 196 and store this instance as the configuration file 198 that may include customizations such as the parameters specifications, action specifications, state lists, action lists, personas who may interact and the like for the record 165. In an example, the system 100 may store the configuration file 198 for the record 165, the blockchain object (e.g., a hash 170 of the record 165 in the off-chain storage 110. The difference between the context schema 196 and the configuration file 198 may be the customized parameters and the types specific to a particular blockchain object. The system may store the values of parameters in the configuration file 198 in the off-chain storage (e.g., in the data repository 179).

The configuration file 198 may be used to create the record 165 and its corresponding blockchain object 108. Values of one or more of the parameters in the configuration file 198 may be received via the user interface 142 to create record 165. The values received may be stored in the data repository 179 using the contextual information such as type information in the configuration file 198. In an example, the user interface 142 may also be used to receive values and/or constraints for interacting with the record 165 and its corresponding blockchain object 108, and the constraints may be stored in the configuration file 198, and the values may be stored in the data repository 179.

The system 100 may use the contextual details of the participant, to generate the appropriate user interface for the participant. For example, to store the record 165 and its corresponding blockchain object for deployment the system 100 may use the configuration file 198 to determine the parameters of the initial state of the record 165, and the actions available in the initial state, and the parameters associated with the actions in the initial state for the record 165. For example, the initial state of the record 165 may be part of the state list 176, the actions available to the participant in the action list 178 and the parameters for the action may also be available in the configuration file 198. Also, the off-chain storage 110 may include the data repository 179 with contextual information about the participant The system 100 may thus display the user interface 142 with all contextual information of the record 165 in the initial state that may facilitate the participant's decision making. The information displayed may be based on the contextual information about the initial state such as the information already available about the record 165, default information for some types of parameters of the record 165 (e.g., a description of a car and model assuming the record 165 is for proof of chain of custody). The user interface 142 may also generate user interface elements such as buttons and entry fields based on the type of the parameter requested. For example, a yes or no decision or a decision with a fixed set of choices may be presented as a button or a drop-down list with the appropriate label from the configuration file 198. A request for a numeric quantity (e.g., a type integer) or name or description (e.g., a type string) may be presented using an input text box.

Blockchain object templates, such as blockchain object template 111 in association with the context schema 196 or the configuration file 198, may be used to create blockchain objects. For example, the blockchain object template 111 may be associated with a configuration file 198. The configuration file 198 may describe the states of the record 165, the actions of the participants in each state, the persona of the participant who may interact with the record 165 in each state and the role of the participant and the like. For example, the state list 176 may provide a series of states or a state map and the next states from a particular state. The actions of the participant who initiates the record 165 in the initial state may be retrieved from the actions list 178. The parameters of the action and the types for these parameters may also be obtained from the configuration file 198. This information may be described as the contextual information of the blockchain object. Also, the system 100 may include contextual information about the participant in the data repository 179.

The user interface generator 140 may generate the user interface 142 using the contextual information from the configuration file. The user interface generator 140 may display the user interface 142, and a participant may enter values for parameters as specified in the configuration file 198 associated with the blockchain object template 111 via the user interface 142. The system 100 may create the record 165 that corresponds to the blockchain object 108 using the machine-readable instructions in the blockchain object template 111. The event stack 104 may receive the values and initialize the blockchain object 108 with the values. The system 100 may store different blockchain object templates for different types of workflows, which may include code for different types of records 165 and/or its corresponding blockchain objects. In an example, the system 100 may select a template that corresponds to the type of the record 165 and/or the blockchain object being created based on the role or persona of the participant. Also, a selected blockchain object template may be instantiated with information from the off-chain storage 110 (e.g., the data repository 179). For example, the system 100 may determine based on the off-chain identity of the participant, the role of the participant logged into the system 100 and constraints on the interactions with the blockchain based on the role of the participant. The system 100 may then select the appropriate blockchain object template for the template and may place constraints on values that can be instantiated for parameters in the selected template based on the constraints for the participant. The parameters in the selected template may be provided from the context schema 196 or configuration file 198.

In an example, the event stack 104 may receive values for parameters in the configuration file 198 from the blockchain oracle 146. For example, the off-chain storage 110 may include many of the values that are predetermined for the participant logged into the system 100. For example, the blockchain identity of the participant and the associated off-chain identify may be stored in the memory 103 or the data repository 179. The blockchain identity may include a cryptographic key, roles of the participant, and constraints on interactions with blockchain objects that may be used for creating and deploying and managing interactions with the blockchain object 108.

The system 100 may use the blockchain service 188 to deploy the hash of the record 165 as the blockchain object 108X. The system 100 may use the identity service 192 and the signing service 148 to cryptographically sign the blockchain object 108 using the public 186/private keys 184 of the participant before deploying the blockchain object 108 to the blockchain 120. The system 100 may also use the private key 184 and the public key 186 of the participant to authenticate events to and from the blockchain 120. Once deployed, the system 100 may receive an address from the blockchain 120. The address uniquely identifies the blockchain object 108 on the blockchain 120. The system 100 may store the address in the data repository 179. The system 100 may also store information such as the location of the blockchain object 108. For example, the identity of the blockchain 120 where the blockchain object 108 is deployed. In an example, the system 100 may deploy dependencies for the blockchain object 108 before deploying the blockchain object 108. For example, the system 100 may deploy a cryptlet or oracle to retrieve real-time data from one or more external sources on a periodic basis before deploying the blockchain object 108. Also, the system 100 may use the storage service 143 to store the blockchain object 108 along with the configuration file 198 in the off-chain storage 110. The off-chain storage 110 may store hashes, such as the hash 170, to verify the data stored on the off-chain storage 110 matches the blockchain object 108 deployed to the blockchain 120. The system 100 may use a blockchain ID (identifier) 174 of the blockchain to choose the blockchain for deploying the blockchain object 108. For example, the system 100 may use a unique ID for each blockchain such as a unique ID for Ethereum™.

The system 100 may receive an event from a source external to the system 100 through the input service 115. For example, the input service 115 may receive interest rates periodically or an update to the record 165. Assume the blockchain object 108 uses the interest rates to determine payment to an entity; the system 100 serves as a bridge between the external world and the blockchain object. The input service 115 may digest the event, identify the record 165 that may use the event and place the event on the event stack 104. The blockchain service 188 may retrieve the event from the event stack 104 and deploy the event to the blockchain 120 as a message addressed to the identified blockchain object. In an example, the input service 115 may receive events (e.g., interactions from the participant) from the user interface 142 to perform actions on the record 165 and generate its hash to deploy as the blockchain object 108. In another example, the API 106 may receive events from the user interface 142 to perform actions on the record 165 and place the events on the event stack 104. The input service 115 may place these events on the event stack 104 for processing. The event stack 104 may provide for a queue of events that may be processed by the different services on the system 100.

In an example, when the system 100 receives an event from the participant to store the record 165 in the off-chain storage 110 and its corresponding hash on the blockchain 120, the system 100 may identify the participant using the identity service 192. Once the participant is identified, the system 100 may retrieve further events from the off-chain storage or the blockchain 120 to identify events associated with the identified participant. Based on the context generated from these events and the context schema 196, the system 100 may use the user interface generator 140 to display a user interface 142 to the participant. For example, based on the state of the record 165, the screens may vary. The configuration file 198 may provide contextual information about the user interface to use based on the state of the record 165.

After deployment of blockchain object 108 to blockchain 120, the system 100 may provide an interface between an event and blockchain object 108 using messages addressed to the blockchain object 108. The blockchain object 108 on the blockchain 120 may receive an event as a message addressed to blockchain object 108, and system 100 may store the event in the off-chain storage 110.

The system 100 may provide an interface between the event stack 104 and the blockchain object 108 based on the context schema 196. For example, the system 100 may use the event stack 104 to receive an event that may affect the record 165 after its hash is deployed as the blockchain object 108 on the blockchain 120. The event may be received from the user interface 142, IoT gateway 102, other applications/systems 107, blockchain oracle 146, blockchain monitor 122, blockchain service 188, etc. For example, the event may be a commodity price, an interest rate, a participant interaction with the blockchain object 108, etc. that affects the record 165. The system 100 may use the configuration file 198, which stores parameters types and constraints for the record 165 that corresponds to the blockchain object 108, to determine whether the event may affect the record 165 and updates the record 165 accordingly. The system 100 may also deploy an updated hash of the updated record 165. Also, the system 100 may use the input service 115 to determine whether an event received from the blockchain 120 through the blockchain monitor 112 invokes a change in the state of the record 165. For example, the record 165 may change its state based on an interaction from a participant external to the system 100 on a node of the peer-to-peer network participating in the blockchain 120. The system 100 may monitor the plurality of events in the new block of blockchain 120 to identify an event associated with the blockchain object 108 or a participant in the system 100 and place the event on the event stack 104.

The configuration file 198 may also describe the properties of the record 165 and its associated blockchain 120 on which blockchain object 108 is deployed, a state map with the current state, possible actions of a participant associated with the record 165, parameters for the actions, personas that may be involved in the actions, and content that may be displayed in the user interface 142 that is associated with interacting with the record 165 and/or its corresponding blockchain object 108. A participant may generate an event (e.g., a message addressed to the blockchain object 108) to interact with the record 165 through the user interface 142. The user interface generator 140 may vary the user interface 142 based on the current state of the record 165, the persona of the participant interacting with the record 165, and the properties of the record 165. For example, the user interface 142 may display one GUI for a participant with the persona of a seller and may display a different GUI for a participant with the persona of a buyer. Each GUI may allow the user to perform a particular action (e.g., accept an offer, reject an offer and the like) associated with the record 165 depending on constraints that may be specified in the configuration file 198. The configuration file 198 may include a user interface (UI) list 173 that includes details of the GUIs to display depending on a variety factors, such as persona, state of the record 165, available actions of the record 165, a list of parameters 175 of the actions, the blockchain where the blockchain object 108 corresponding to the record 165 is deployed or is about to be deployed, participant context information and the like.

In an example, assume record 165 relates to interaction between participants for certified organic produce. The hashing service 144 may hash a certificate for the produce and place the hash of the certificate on the blockchain 120.

In another example, the hashing service 144 may be used to hash the audio/video recordings captured by law enforcement agencies and deploy the hash to the blockchain. The hash on the blockchain is immutable and may serve as proof of custody of the audio/video recordings, also serve as proof of possession at the time the hash was deployed to the blockchain and also provide proof against tampering at a later date.

Similarly, the hashing service 144 may be used to hash a file available for rapid prototyping (e.g., 3D printing), a video or audio licensed (e.g., movies purchased on an Xbox) to a participant, clinical trial reports and the like. The system 100 may then deploy the hash to the blockchain 120. For example, in the case of clinical trial reports, the hashes or history of hashes may be used to verify the reports are intact and were not tampered with. The system 100 may thus improve the efficiency of regulatory processes.

In an example, data may be stored on the off-chain storage 110, because the data is inappropriate for storage on the blockchain 120. For example, personal history files, files with personally identifiable information, medical records and the like. The hashing service 144 may be used to store a hash of the data stored in the off-chain storage 110 to authenticate proof of possession at the time the hash was deployed to blockchain 120, proof against tampering and proof of chain of custody and the like.

In an example, data from government records may be hashed and placed on blockchain 120. For example, land ownership records, motor vehicle registration records, licensure information (e.g., doctors, pharmacists, lawyers and the like), change of name information, tax receivables and the like may be hashed using the hashing service 144 and the hashes deployed on the blockchain 120. Thus, the confidence in government records may be increased while reducing the cost of maintaining these records. The hashing service 144 may be used to identify any anomalies in the records. For example, before a real estate is purchased, the land records may be verified using the hashing service 144. Thus, the hashing service 144 may be used for proof of chain of custody, proof against tampering and proof of possession.

The identity service 192 may reduce the complexity of interacting with blockchain 120 for a participant of the system 100. For example, the blockchain identity of the participant may be linked to their off-chain identity such as the first name and last name, an identifier of the role and organization of the participant. The system 100 may create an instance of the context schema 196, i.e., configuration file 198 during deployment. The system 100 may display a user interface 142 to populate an off-chain storage 110 using the configuration file 198 along with the data repository 179 to obtain the context and to associate participants with their personas and their roles. The configuration file 198 along with the data repository 179 in the off-chain storage 110 may associate the persona 171 with a participant on the system 100. In other words, associate an identity or username of the participant with a persona describing the relationship between the participant and the blockchain object 108. For example, assume the record 165 and/or the blockchain object 108 relates to the sale of a car, and the persona of the participant in the system trying to sell the car may be a seller. The configuration file 198 along with the data repository 179 in the off-chain storage 110 may associate the participant with the persona in the configuration file 198. Associating the participant with this persona allows the participant to deploy a hash of the record 165 as the blockchain object 108 to the blockchain 120 to provide proof of chain of custody of the asset. Since the participant is initiating the event, the role 172 of the participant may be that of an initiator. The configuration file 198 may serve a map to retrieve the information from the data repository 179 on the off-chain storage 110 to identify the participant. The configuration file 198 along with the data repository 179 may store the blockchain identity of the participant, the information aboute the persona who may deploy the blockchain object 108, a state list 176 listing all possible states of the record 165, and an action list 178 listing the allowed actions of each persona in each state. The system 100 may receive an event associated with the record 165 through the user interface 142 and the API 106. For example, through the API 106, the system 100 may receive details about the asset from the participant. In another example, the system 100 may receive an event from the input service 115 or may receive an event from a database of used car prices that can provide pricing event for a used car to be offered for sale.

The system 100 may use a cryptlet or an oracle or other code for post processing events before the event is stored in the off-chain storage 110. The blockchain oracle 146 may retrieve event at periodic intervals based on a set of rules from a storage system or from other sources such as live feeds of the event. In an example, the blockchain oracle 146 may be used to periodically scan the events stored in the off-chain storage 110 and trigger actions based on changes to the off-chain storage 110. For example, the off-chain storage 110 may receive new documents, and this may trigger a new event. The new event may be placed on the event stack 104 to be retrieved by other services. Also, post processing service 149 may process the events that are queued by the event stack 104 to identify the relevant events. The post processing service 149 may run in a secure enclave and write the attestable activity to the blockchain 120. In an example, the post processing service 149 may write the attestable activity to a consortium blockchain. The consortium blockchain may not allow access to off-chain storage 110 other than through a cryptlet or an oracle due to security restrictions.

The system 100 may also manage the record 165 and/or its corresponding blockchain object 108 after the blockchain object 108 is deployed on blockchain 120. The blockchain monitor 122 may retrieve events from the blockchain 120 as events are posted on new blocks on the blockchain 120. The retrieved events from the blockchain 120 may be passed to the event stack 104.

In an example, the system 100 may store in the data repository 179. In an example the data repository 179 may be divided into three data repositories, namely the meta data store, transactional store and the reporting store.

The metadata store may store configuration for blockchain object 108. The user interface generator 140 may use the meta data to generate user interfaces. The metadata store may also store information about the role information associated with the blockchain object 108. In an example, the role information may be used to allow access control for the participants of the system 100 based on the role information.

The transaction store may store the location where the blockchain object 108 is stored in blockchain 120, the transaction requests (e.g., offer for sale or counter-offer and the like), properties of the blockchain object 108 (e.g., state, who may interact, how to interact, the format of the messages, the format of the interaction and the like), the blockchain identities of the participants, the blockchain identities of the participants who requested the transactions (e.g., offer for sale or counter-offer and the like), the identity of blocks in the blockchain where the transactions were requested and the like.

The reporting store may include a combination of the information in the metadata store, the transactional store that may be structured using the procedures and constructs such as the logic expressed in the configuration file 198 (e.g., logic for the blockchain object 108). For example, the reporting store may allow the structuring of events in the data repository 179. The structing of the events in the data repository 179 may allow the data to be queried by services that are not designed to interact with the blockchain. For example, analytics and/or reporting services may access the structured data in the reporting store.

Additionally, the input service 115 may receive events from other external sources to manage the record 165 and its corresponding blockchain object 108. The sources may include cryptlets or other sources such as IoT gateway 152 or the systems/applications 107. Information from the sources are authenticated and received via the input service 115 may be used by the system 100 to post messages to the blockchain object 108 on the blockchain 120.

The event stack 104 along with blockchain monitor 122 may be used to synchronize changes of state and events for the blockchain object 108 between the blockchain 120 and the off-chain storage 110. Similarly, the storage service 143 may synchronize any changes to blockchain object 108 originating from the system 100. The storage service 143 may store a copy of the record 165, the blockchain object 108, transactions on blockchain 120, states of the record 165, hash 170 of the blockchain object 108 and subsequent hashes if the record 165, and the configuration file 198 on the off-chain storage 110. A hash may be used to indicate a state of the record 165 on the off-chain storage 110 at a particular point in time. The system 100 may use the hashes to determine whether the data stored in the off-chain storage 110 matches the data stored in blockchain 120.

Although system 100 is described with reference to generating user interface 142 for interaction with one or more participants of the system, the system 100 may be used in another embodiment without the portal to create, authorize, manage and deploy the blockchain object 108 to the blockchain 108. In an example, the system 100 may allow one or more components to be used to allow interaction between the blockchain object 108 and other services or applications. Examples of other services include Product as a Service (PaaS), Infrastructure as a Service (IaaS), and System as a Service (SaaS). For example, the system 100 may allow a machine-based interaction to create, authorize, manage and deploy the blockchain object 108 In an example, authorize may mean authorizing participants to deploy specific instances of blockchain object 108 or interacting with an already deployed blockchain object 108 on the blockchain 108.

Figure 4:
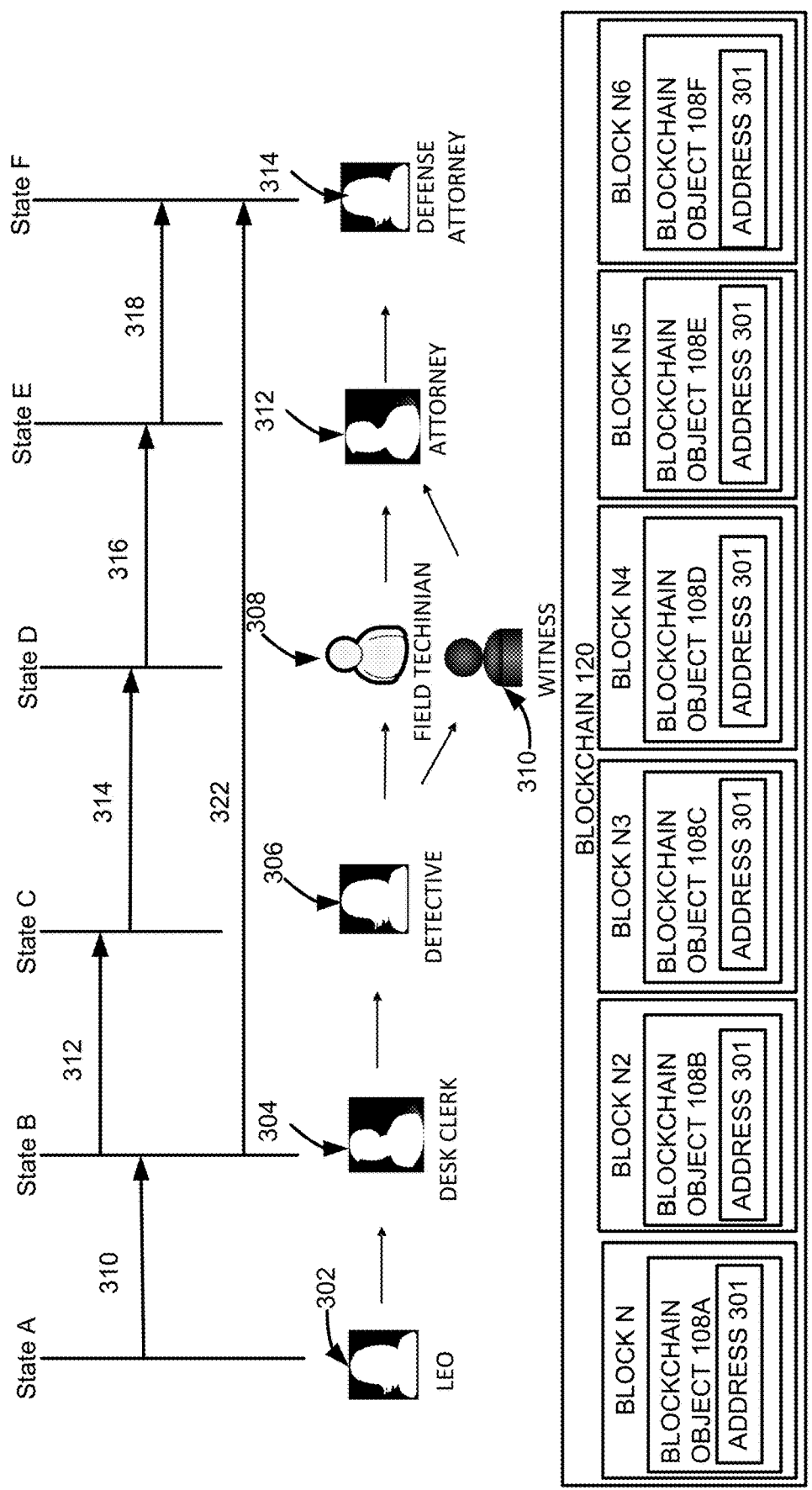
FIGS. 4 illustrates an example of state transitions between different states of a blockchain object, according to an embodiment of the present disclosure.

FIG. 4 shows an example of states of the record 165 tracked by the system 100. In this example, assume the record 165 governs interactions between participants and a record such a crime scene investigation. The blockchain object 108 (A through F) is generated, deployed and managed by the system 100. The record 165 may be generated by the law enforcement officer (LEO) 302 during an investigation of a suspicious neighborhood. For example, the LEO 302 may encounter a house and one or more persons fleeing from a house as the LEO 302 is on patrol. The LEO 302 may have a body camera. The system 100 may receive the video footage and store the video footage as the record 165 in the off-chain storage 110. The system 100 may generate a hash of the video footage and deploy the hash to the blockchain 120. Assume the hash of the video footage is stored as the blockchain object 108.

In an example, the record 165 may include a file and metadata associated with the file. For example, the file may be the body camera footage from the LEO 302. The metadata may include the make and manufacturer of the body camera, the calibration information of the body camera, the chain of custody of the body camera, the chain of custody of the video footage to the off-chain storage 110 and the like. In another example, the record 165 may include the conversations between the LEO 302 and dispatch. Assume the crime scene is an attempted robbery. The LEO 302 may perform a preliminary sweep of the property and report his observations to the dispatch. The system 100 receive these updates as they are entered by the desk clerk 304, store the updates to the record 165 on the off-chain storage 110, generate a hash of the updated record and store the hash on the blockchain 120 as blockchain object 108B. FIG. 4 shows an example whereby the system 100 tracks six states A-F for the record 165 that corresponds to the blockchain objects 108 (A-F). For example, the blockchain object 108 may transition between six different states before the conclusion of the legal proceedings. State A depicts the creation of the record 165 and the deployment of the corresponding hash as the blockchain object 108A. State B shows updates to the record from the desk clerk 304. State C is the state of the record as a result of a detective 306 investigating the crime scene. State D is the state of the record 165 after a field technician 308 such as a forenscis expert has examined the property. In the alternative State D may include information from the witness 310. State E is the state of the record 165 during the prosecution of the case by a public attorney 312. . State F is a the result of interaction with a defense attorney 314. A new blockchain object may be cretaed for each state, shown as blockchain objects 108 A-F, and each blockchain object may be stored on a new block, shown as blocks N-N6, of blockchain 120. For example, the blockchain object 108A may be deployed by the LEO 302 using the system 100. The blockchain object 108B may be generated as a result of the interaction between a message from the LEO 302 and the blockchain object 108A stored on block N2 of the blockchain 120. In addition to states A-F, the system 100 may track the states created, active, terminated, completed, inspected and appraised for the record 165 to track the intermediate states between the transitions A-F described in this figure.

The hashes for each state of the record 165 on the blockchain 120 provide a proof of custody, proof of chain of custody and proof against tampering. For example, when the record 165 is created by the LEO, the record 165 may include the body camera footage. The system 100 generates a hash of the body camera footage and stores the same on the blockchain 120. The hash provides an immutable record of the proof of custody of the body camera footage.

In an example, the system 100 may generate metadata associated with a file. For example, the record 165 may include metadata such as the calibration information of the body camera, the GPS (Global Positioning System) location of the footage, the identity of the LEO 302, the other law enforcement officials involved in the action and the like. The system 100 may generate a hash of the record 165 that may include the metadata in addition to the body camera footage. Thus, the system 100 may provide a proof of chain of custody of the body camera footage and the participants who interacted with the record 165 such as the desk clerk 304 at dispatch and the like. The system 100 also provides a proof against tampering by allowing a participant such as the defense attorney 314 the ability to examine the chain of custody, to identity any anomalies in the chain of custody, authenticate the body camera footage to detect any tampering by generating a hash of the video file the defense attorney 314 is given access to. Also, the system 100 may use the configuration file 198 to restrict access to the record 165 to a limited set of participants. In an example, the system 100 may log all access to the record 165 on the blockchain 120 along with a hash of the participant who interacted with the record 165. In an example, a participant may interact with the record 165 to include additional information. For example, the field technician 308 may interact with the record 165 to add fingerprints from the crime scene. The system 100 may thus provide a proof of chain of custody of the fingerprints by logging in information. The system 100 may also update the record 165 with the information obtained from the witness 310.

In an example, the system 100 may allow the defense attorney 314 to deploy a message directed to the blockchain object 108A to authenticate the participants who interacted with the record 165 during the state A. The system 100 may respond with encrypted messages on the new block update in response to a message object deployed by the defense attorney 314. For example, the defense attorney 314 may obtain information about the calibration of the camera or when the body camera was last checked out by the LEO 302 and the like to find possible evidence of tampering. The system 100 may provide the foundation for use of the evidence in a legal proceeding.

To interact with the blockchain object 108A, the defense attorney 314 304 may send an event (e.g., a message to the blockchain object 108A addressed using a unique identifier of the blockchain 108A) to the blockchain 120. A node in a peer-to-peer network of nodes mining the blockchain 120 to generate a consensus may receive the event, and process the event for generating new block N2 of the blockchain 120. In an example, the event (e.g., a blockchain object message) may be addressed to an address 301 (e.g., 0xBB9bc244D798123fDe783fCc1C72d3Bb8C189413) of the blockchain object 108A.

Figure 5:
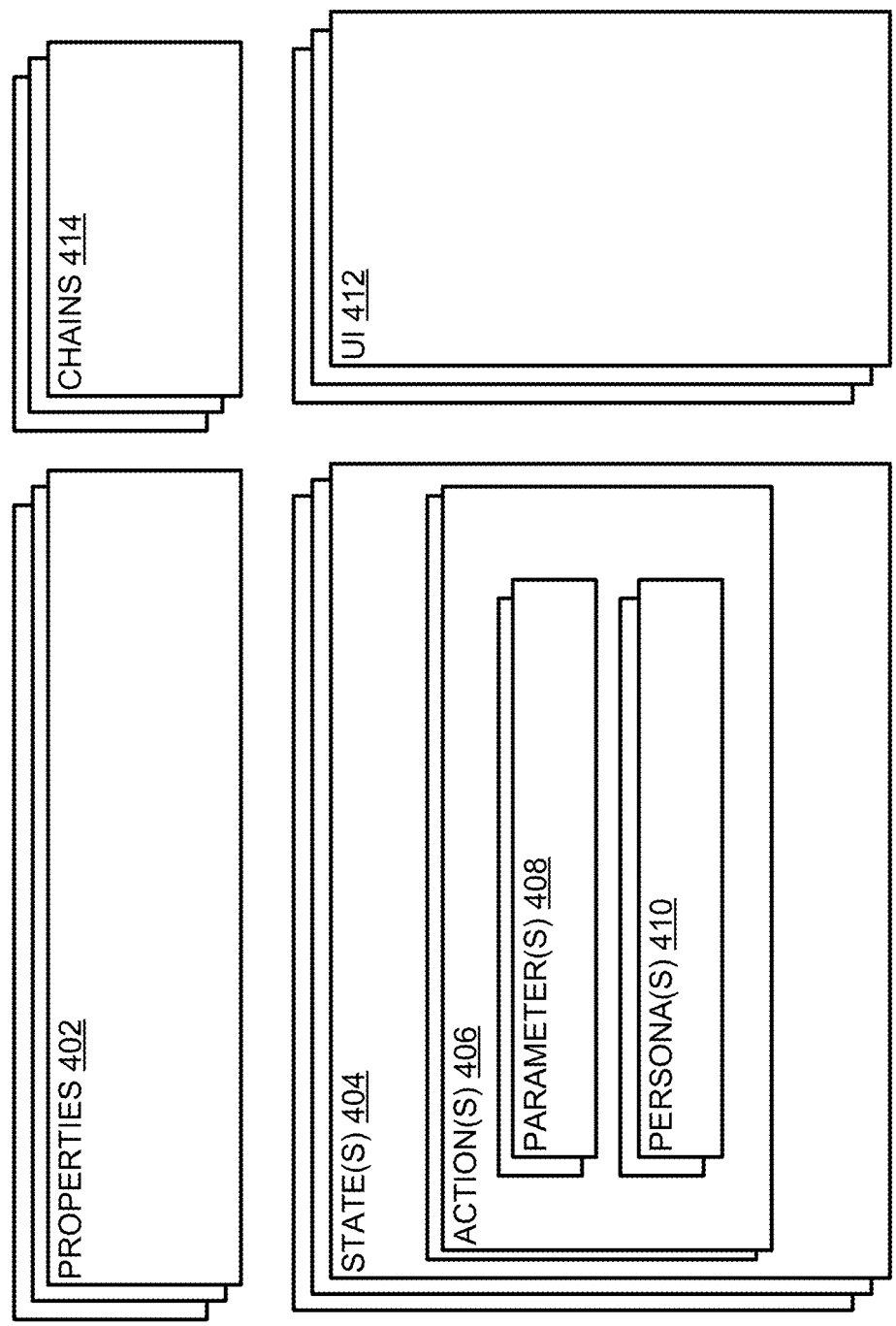
FIG. 5 shows a context schema, according to an embodiment of the present disclosure.

FIG. 5 shows an example of the context schema 196. For example, the context schema 196 includes properties 402 of the record 165. The properties 402 of the context schema 196 may correspond to the details of the configuration file 198 of the record 165. In an example, the configuration file 198 may include the state list 176 that may correspond to the states 404 in the context schema 196. Similarly, the action list 178 may correspond to the actions 406, the persona 171 may correspond to the persona 410, the blockchain id 174 that corresponds to the blockchain identifier 414, the parameter 175 that corresponds to the parameters 406 and the user interface 143 that corresponds to the user interface 412 of the configuration file 198 and the context schema 196 respectively.

For example, the blockchain identifier 414 may identify the blockchain where the hash of the record 165 is deployed and the like. The system 100 may use the context schema 196 to generate the configuration file 198, which is an instance of the context schema 196 populated with types of the values for a particular record 165, such as blockchain object 108 and the values of the particular blockchain object may be stored in the data repository 179. In an example, the system 100 may generate a configuration file for each record 165 and the corresponding hash that is deployed, managed and/or tracked.

In an example, the system 100 may use the context schema 196 to generate the configuration file 198 during deployment of the hash of the record 165 to the blockchain object 108.

The configuration file 198 described below with reference to FIG. 6 may also include a state list of possible states of the record 165 and may serve as a map to describe the past, present and future states of the record 165. The system 100 may retrieve the current state of the record 165 from the data repository 179 using the configuration file 198 as a map and for providing additional context. The configuration file 198 may map possible states of the record 165 to one or more participants, roles of participants and the like. For example, the system 100 may use the configuration file 198 with the data repository 179 to determine the current state of record 165, the actions available for the personas and the parameters of the actions, and possible states of the record 165 based on a current state for particular participants.

The configuration file 198 (descried below with reference to FIG. 6 below) or the context schema 196, may be used to generate GUIs in the user interface 142. For example, the configuration file 198 may be used to populate a GUI using the user interface generator 140 to display contextually accurate user interface from the UI list 173 to display event information for the record 165 from the data repository 179. The GUIs generated based on the UI list 173 provide a mechanism fora participant to interact with the record 165. The system 100 may display a GUI in the user interface 142 for the participant to view contextual information about the record 165 such as the parameters, the state, and personas that may interact with the blockchain object. For example, the system 100 may display a list of the records 165 that are associated with the LEO 302 shown in FIG. 4.

The system 100 may also use the configuration file 198 or the context schema 196 to provide context for other services. In an example, analytics services 132 may utilize the blockchain data stored in the off-chain storage 110 (e.g., the data repository 179) and the configuration file 198 for data modeling. The configuration file 198 provides context to the blockchain data. The blockchain data without the configuration file 198 may be a chronological list of events stored with other additions to provide immutable verification of the events. The blocks in the blockchain may contain random events grouped together based on time of arrival of the blockchain objects. In an example, a block in the blockchain may be populated with disparate events such as blockchain object deployments, a status change of the record 165 that corresponds to the blockchain object 108 (in FIG. 3), a message to another blockchain object on the blockchain, transfer of cryptocurrency between two participants, and the like. Subsequent updates to events on the blockchain such as updates to the state of the record 165 that corresponds to the blockchain object 108 (in FIG. 3) are populated in the next available block of the blockchain with other events that arrive close to each other. Thus, the blocks in the blockchain contain random events. The system 100 may provide access to the record 165 to authorized participants with the contextual information from the configuration file 198. The configuration file 198 may thus be used as an index that allows retrieval of events that are otherwise distributed randomly in the blockchain 120.

For example, the analytics service 132 may use the configuration file 198 and events in the off-chain storage 110 (e.g., the data repository 179) to transform the events in a blockchain for modeling. The analytics service 132 may retrieve the events from the off-chain storage 110 similar to the how the service handles other data for analytics. For example, the analytics service 132 may use the data repository 179 (e.g., SQL database) to store and retrieve events (e.g., transactions on the blockchain 120) from the blockchain 120. The analytics service 132 may also use the configuration file 198 to retrieve events for predictive model building and optimization. The configuration file 198 can provide a hierarchical relationship linking a record 165 and to entities that have interacted with the record 165, possible entities who may interact with the record 165, possible interactions with the record 165, relationships between events that are evidenced on the blockchain, state of the record 165 represented by the blockchain object 108, past states of the record 165 and possible future states of the record 165. For example, the configuration file 198 can provide a hierarchical index for an event on the blockchain, linking the event with entities in the real world, the interactions of the participant in other related events, constraints on the real world participant in future related events, entities that may interact with the event in the future and their degrees of freedom in the interaction and the like. This index can be used to retrieve relevant information for analytics.

In an example, the off-chain storage 110 includes the data repository 179 to store values of parameters described in the configuration file 198. The analytics service 132 retrieves events from the data repository 179 for model building, and groups the events according to persona, role or the like. The analytics service 132 may also combine the events in the off-chain storage 110 with other sets of data such as profile data of consumers for model building.

In an example, the system 100 may use the analytics service 132 to identify products or services a customer is interested in based on the events stored on the blockchain 120. The system 100 may then combine this information with the browsing history of the customer. Thus, the system 100 may provide services to allow businesses to track their customer base better, identify potential customers and allow targeted advertising to potential customers.

In an example, the off-chain storage 110 may organize events using the configuration file 198 before storing them in the off-chain storage 110. For example, the off-chain storage 110 may store events related to the same persona under the same classification. The off-chain storage 110 may store related data together instead of chronologically. The analytics service 132 may use the context to transform and model the data.

The system may use the context schema 196 to determine the constraints on the blockchain object. For example, the context schema may specify who, when, where, what, why and how for interactions with the record 165 that corresponds to the blockchain object 108. In an example, the system may store a configuration file 198, an instance of the context schema 196 for each record and/or its corresponding blockchain object. The system may use the context schema 196 to determine the persona type who may act on the record 165. In an example, the context schema 196 may describe a hierarchy of blockchain object, state, action, persona, role and other contextual information along with the history of the event. The system may use an instance of the context schema, i.e., a configuration file for each blockchain object.

Figure 6:
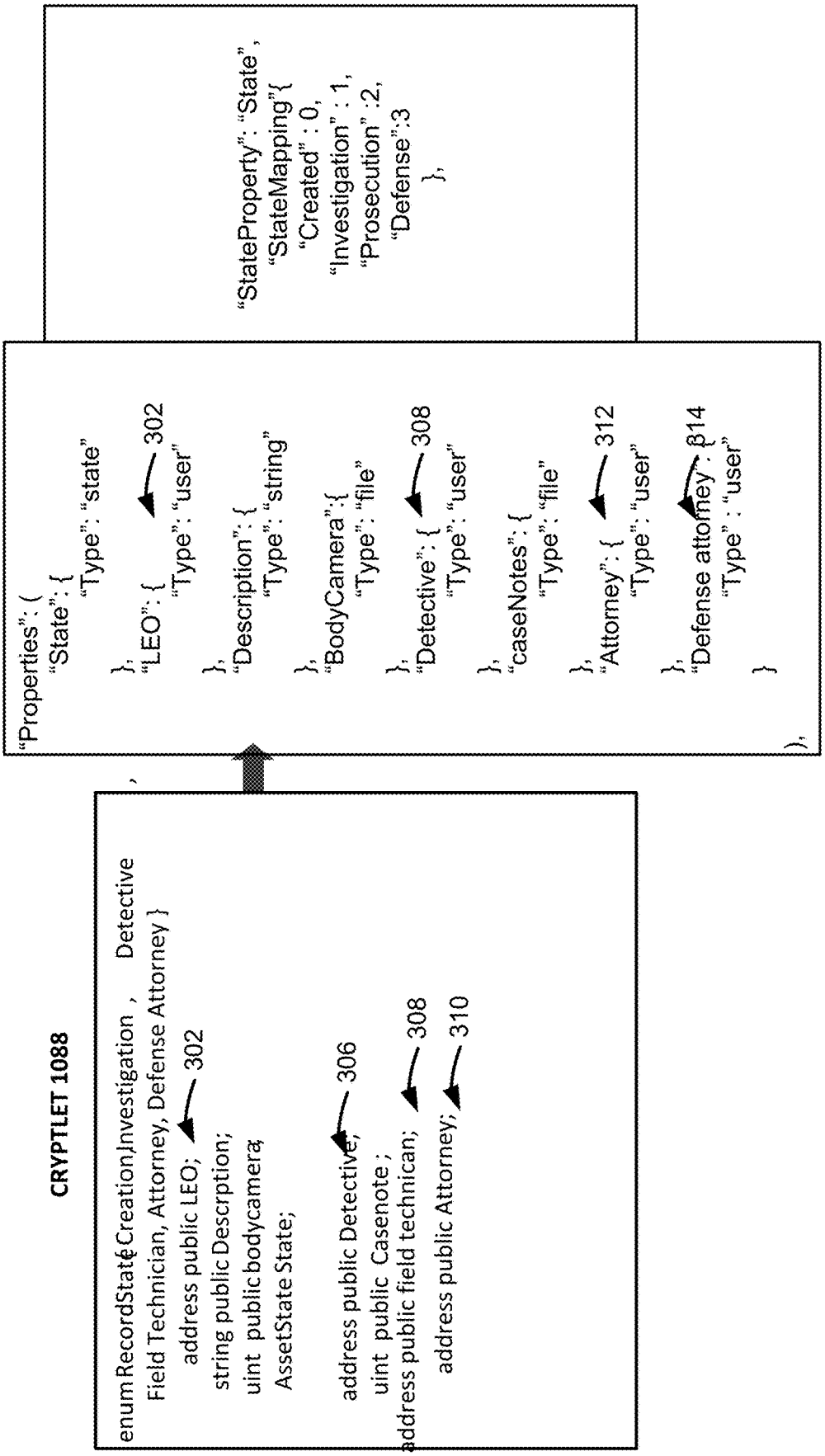
FIG. 6 shows an example of a blockchain object and a corresponding context schema instance, according to an embodiment of the present disclosure.

FIG. 6 shows an example of the code 109 of the blockchain object and/or a cryptlet 1088. The example also shows the corresponding configuration file 198. In an example, the system 100 may create the configuration file 198 as an instance of the context schema 196 during deployment, based on the inputs received from the user through the user interface 142.

The configuration file 198 may describe the personas of the record 165 that corresponds to the blockchain object 108. In an example, a cryptlet 1088 may be associated with the record 165 and include the code 109 shown on the left-hand side of the FIG. 6. In an example, in the record 165 may have constraints. The system 100 may allow the the personas, the LEO 302, the detective 306, the attorney 312 and the defense attorney 314 to interact by using a cryptlet 1088 that regulates access as defined in the code 109. Similarly, in the configuration file 198 the types of the personas the LEO 302, the desk clerk 304, the detective 306, the field technician 308, the witness 310, the attorney 312 and the defense attorney 314 are described as "user".

The configuration file 198 provides a a map of the states. As described above with reference to FIG. 4 the blockchain object 108 may transition between six different states before the conclusion of the legal proceedings. The configuration file 198 may provide the list of all transitions possible until the conclusion of the sale of the asset.

The configuration file 198 may have the state list 176 including the possible states for the transfer of an asset shown in FIG. 4. The state list 176 includes a mapping such as all possible states from state A through state F. As described above with reference to FIG. 4, state A depicts creation of the record 165. State B, State C and State D are during the investigation. State D is during prosecution of the case and state E is during defense of the case by the defense attorney 312. In addition to the states A to F described above, the blockchain object may include additional states such as tracking interactions between the record 165 an participants such as the desk clerk 304, the field technician 308. .

Similarly, the configuration file includes the parameters for each of the actions of personas in each of the states. For example, in the state created, the parameter may be a body camera foot age of the type "body camera". In an example, the persona initiating the record 165 and the corresponding blockchain object 108 may be the LEO 302 as described above with reference to FIG. 4. The persona LEO 302, may during the state create may be required to provide the parameter case details. The system 100 may receive the information and store the information in the data repository 179 as described above with reference to FIG. 1. The record 165 may be initialized with the record 165 details. The system 100 may also store the initial state of the record 165 and deploy a hash of the record 165 as the blockchain object 108. The system 100 may after initializing the state change the state from created to investigation.

Other examples of the parameters may include a case notes, during investigation by the detective 308.

The configuration file 198 may allow the participant to identify the types of each of the parameters such as the action list 178 (not shown in FIG. 6, but shown in FIG. 1), the state list 176 and the like and obtain contextual information. In an example, the initial values and the intermediate values of the record 165 that corresponds to the blockchain object 108 may be stored in the data repository 179 (shown in FIG. 1).

Methods according to embodiments of the present disclosure are described below. The methods are described as being performed by the system 100, such as the system 100 shown in FIG. 3, but the methods may be performed by other systems. The methods and operations described herein may be performed by one or more servers or other types of computers including at least one processor executing machine-readable instructions stored on a non-transitory computer readable medium. Also, one or more of the steps of the methods may be performed in a different order than shown or substantially simultaneously.

Figure 7:
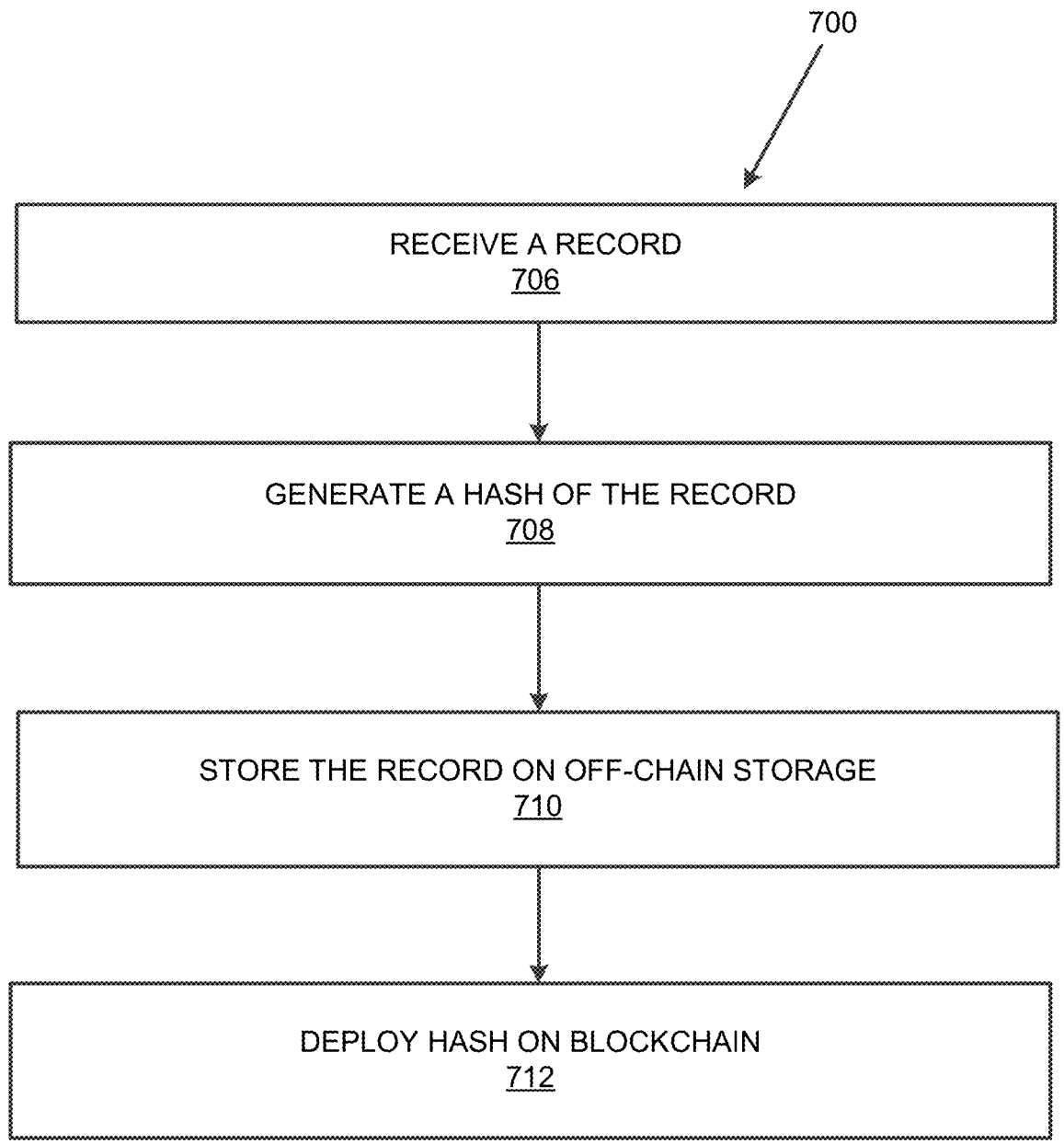
FIGS. 7-9 show examples of methods, according to embodiments of the present disclosure.

FIG. 7 shows an example of a method 700 for a blockchain record storage system with a proof of custody, proof of chain of custody and proof against tampering check for the records using a blockchain object.

At block 706, the system 100 may receive a record. In an example, a record may include a digital asset and metadata. For example, a digital asset may be a document generated during the normal course of business in an organization. A police record may include a digital file and metadata associated with the digital record. For example, assume the digital asset is a video from a body camera of a law enforcement officer. The metadata associated with the digital file may include the make and model of the body camera, a date the camera was last calibrated, date and/or time the camera was checked out, the procedure followed to preserve the video in the normal course of business and the like.

In an example, the context schema 196 for the record 165 may include information about the participants who may access, modify or otherwise use the digital files and the extent of access to the digital file. In an example, the system described in FIG. 3 above may be used to control access to the digital files, while providing access to proof of custody, proof of chain of custody and/or proof against tampering for the digital files. As described in FIG. 3 above, the context schema 196 may be stored in the memory 103. In an example, the context schema 196 may include a state list with a set of possible transitions from each state (i.e., state map) and a persona list of acceptable personas who may interact with the off-chain digital file that corresponds to the blockchain object for each state. Also, context schema 196 may include a set of actions or an actions list listing all the actions available to the participant. The actions on the actions list may request parameters. The system 100 may determine the type for each of the parameters in the context schema 196. In an example, the context schema 196 may also include a set of graphical user interface items that may be used based on the context and the information in the state list, action list, persona and role of the participant. In an example, the system 100 may generate an instance of the context schema 196 as a configuration file 198. The configuration file 198 as shown in FIG. 3 may include the persona 171, role 172, state list 176, action list 178 and the like.

In an example, the record may be received from another system 107, the user interface 142 and the like. In an example, a file management system may be built around the system 100. For example, the police department may use the system 100 to maintain their digital assets. Digital assets may include records created during the normal course of business such as memoranda, investigation reports, logs of entry and exit, access to records and the like. In an example, the record may include the file and metadata associated with the file. In an example, the system 100 may use the configuration file 198 to determine the access controls for the record, the proof of custody requirements, the requirements to establish foundation for the chain of custody and the like. In an example, these parameters may be described in the actions list 178 corresponding to the initial state in the state list 176 for a record. For example, the initial state of the record may be the creation of the record and storage of the record in the off-chain storage 110.

In an example, the user interface generator 140 may determine the user interface based on the context schema 196 and the contextual information, i.e., the state of the record to receive metadata information relating to the record. For example, if the record is new, the system 100 may not include details of the participants in the record. The system 100 may generate an initial state parameter request to obtain information about the initial parameters. The user interface generator 140 may present the user interface 142 to the participant to receive the initial parameter. The user interface generator 140 may receive the initial parameters for the record and process the initial parameter through the API 106. The response may be placed on the event stack 104 as an event for other services on the system 100.

At block 708, the system 100 may generate a hash of the record. In an example, the system 100 may generate a hash of the file, metadata associated with the file, and/or both. For example, the system 100 may store the metadata associated with the file in a data repository in the off-chain storage 110 and generate a hash of the file in the record. In another example, the system 100 may store the received initial parameters based on the context schema 196 in the data repository. In another example, the system 100 may use the information available from the off-chain storage 110 to populate the initial parameter of the metadata.

At block 710, the system 100 may store the record on the off-chain storage 110. For example, assume the record includes the body cam footage file from a law enforcement office and metadata associated with the file. The system 100 may store the video footage on the off-chain storage 110. The system 100 may store the metadata in the data repository.

At block 712, the system 100 deploy the hash of the record as a blockchain object 108 to the blockchain 120. The hash of the record provides an immutable proof of custody of the record including the time the hash was deployed to the blockchain. In an example, the hash of metadata associated with the file in the record provides the foundation for chain of custody and proof against tampering. For example, the hash of metadata may be deployed on the blockchain 120. In an example, the hash of the metadata may indicate the participant who handled the file. For example, assume the record 165 is a record of a law enforcement personal's body camera footage. The metadata may indicate the attributes of the file such as the location, the identity of the law enforcement personal, the chain of custody of the equipment, the chain of custody of the people who handled the file and the like. The system 100 may deploy the hash of the record to provide a proof of chain of custody of the file. For example, the system 100 may track access requests to the record and generate a hash of the access request. In an example, the system 100 may thus establish the absence of access as a foundation required for presenting the evidence in a legal proceeding. As described above with reference to FIG. 3, the blockchain service 188 may deploy the hash of the record to the blockchain 120.

Figure 8:
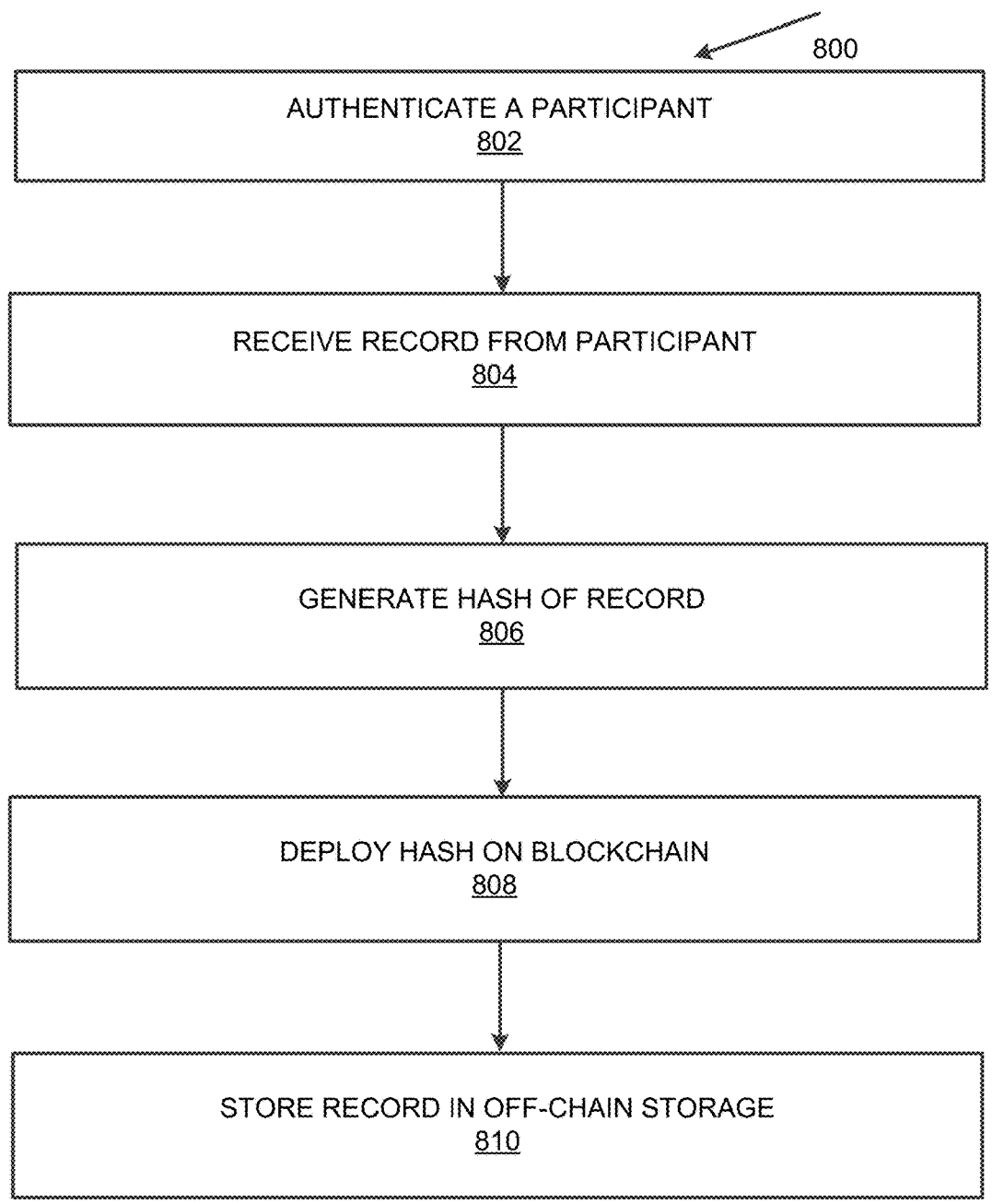

FIG. 8 shows an example of a method 800 for an immutable record storage system using a blockchain object.

At block 802, the system 100 authenticate credentials of a participant. For example, assume the system 100 is an immutable record storage system for storing records. The system 100 may store the record 165 based on the configuration file 198. In an example, the configuration file 198 may list the parameter for the record 165 for proof of custody.

In an example, the configuration file 198 may specify the authentication requirements for participants. Assume the system 100 is a storage system for storing records of a government or a business during the normal course of business dealings. The system 100 may authenticate a participant based on credentials of a participant such as username and password as discussed above with reference to FIG. 1.

At block 804, the system 100 may receive a record from the participant. For example, an authenticated participant may be an employee in a government office. The system 100 may use the configuration file 198 to determine the access restrictions on the record 165. For example, the government may require records to include a minimum specifications such as the person creating the record, the time of creation of the record, the participants who accessed the record and the like. The configuration file 198 may use a cryptlet to enforce these minimum specifications. For example, the minimum specifications may be taliored to ensure compliance with the legal requirements such as the rules of evidence, the rules of the government and the like. For example, a governmental record may need to be created by an employee with the required authorizations. The system 100 may verify these authorizations before the record is created. The system 100 may also generate metadata as part of the record 165. The metadata of the record 165 may provide additional information on the proof of custody. For example, a record may contain information that may require security clearance. The system 100 may provide for proof of custody for the record 165 without exposing the record using the hash deployed on the blockchain.

In another example, the system 100 may provide for proof of chain of custody. For example, the record 165 may lose its evidentiary value if accessed by unauthorized participants. For example, the record 165 may be a bodycamera footage of a law enforcement officer. Under the foundations of evidence, if the body camera of the law enforcement officer was tampered with or the video file itself was tampered with, the body camera footage may no longer be allowed in a legal proceeding. The system 100 may allow for authentication of the chain of custody or proof of chain of custody by including the metadata information in the record 165. For example, the record 165 may include a file and metadata associated with the file to establish chain of custody.

At block 806, the system 100 may generate a hash of the record 165. For example, the system 100 may generate a hash of a body camera file. In another example, the system 100 may generate a hash of the body camera video file along with the metadata associated with the body camera video file. The configuration file 198 may include details of the kind of metadata required to authenticate the record 165. For example, establish proof against tampering the metadata may include details such as when the body camera was checked out from the police station, when the body camera was calibrated, who had access to the body camera, the path taken by the video to the system 100 and the like. The system 100 may then establish a chain that links the file right from the moment it was recorded to the time it was stored. The hash of the video camera footage provides proof that the video footage was not altered. Thus system 100 may provide proof against tampering. The rules of evidence are based on awarding a seal of approval for standard practices in government offices. The system 100 may provide positive proof of custody, proof of chaing of custody and proof against tampering.

In an example, the system 100 may include more than one file in the record 165. For example, record created may be periodically collected and stored on the off-chain storage 110. The system 100 may generate a hash of the set of files collected and store the collective hash of the files during a certain period of time.

At block 808, the system 100 may deploy the hash on the blockchain 120. In an example, the hash may be deployed as part of a transaction the a blockchain 120 in the space for transaction notes. For example, on the bitcoin blockchain the system 100 may use the notes allowed for transaction of bitcoin to be used for storing a hash.

At block 810, the system 100 may store the record in the off-chain storage. In an example, storing the hash of the file on the blockchain 120 and storing the record in the off-chain storage may allow the blockchain 120 to remain small, while providing proof of custody, proof against tampering and proof of chain of custody for a large file. In an example, the system 100 may include machine readable instructs in a cryptlet that corresponds to the record 165. For example, the record 165 may include access restrictions, record details of who accessed a record and the time of access to the record and the like. The cryptlet may use the configuration file 198 to restrict access to the record 165.

In an example, the system 100 may receive an update to the record 165. The system 100 may update the record 165. The system 100 may then generate an updated hash of the updated record. The system 100 may then deploy the updated hash on the blockchain. In an example, the system 100 may log access to the record 165. The system 100 may create and deploy an updated hash of the update record to the blockchain 120. In another example, the system 100 may generate a hash when the record 165 is tampered. For example, the system 100 may deploy a hash of the record 165 whenever a user tries to exceed his authorization to access the record 165. In an example, the system 100 may use include metadata about the access to the record 165 before generating a hash of the record. Thus, the system 100 provides proof of custody, proof against tampering and proof of chain of custody.

In an example, the system 100 may use the configuration file 198 to determine whether a participant that may be associated with the record 165. For example, assume the record 165 deals with a cocoa free trade. The system 100 may determine whether the participant is authorized to perform an action on the record 165. The record 165 may be accessible to a limited set of participants such as the farmers or distributors when the record 165 is created.

In an example, the system 100 may determine a chain of custody specification for the record 165 based on a configuration file 198. The system 100 may then determine the identity of participants that interact with the record 165 based on roles of the participants as specified in the configuration file 198. The system 100 may then determine based on the metadata whether the record 165 meets the chain of custody requirements.

In an example, the record 165 may include metadata about the participants. For example, to establish a chain of custody for the record 165, the system 100 may track the participants who accessed the record 165. The system 100 may recognize access as reading the record 165 or modifying the record 165.

In another example, the system 100 metadata may include details of a commercial transaction. For example, the purchase of a digital asset such as a music file may be placed on the blockchain 120. In an example, the record 165 may include details of sale or purchase of a music file or media file. The system 100 may use the hash of the record 165 as a decryption key to play the music file or media file.

The system 100 may also use the record 165 to record proof of purchase of intangible assets. The entire land registry record may be made available in the form of hashes on the blockchain. The system 100 may use the record 165 as a proof of purchase of the intangible asset such as transfer of land between one participant and the next.

Figure 9:
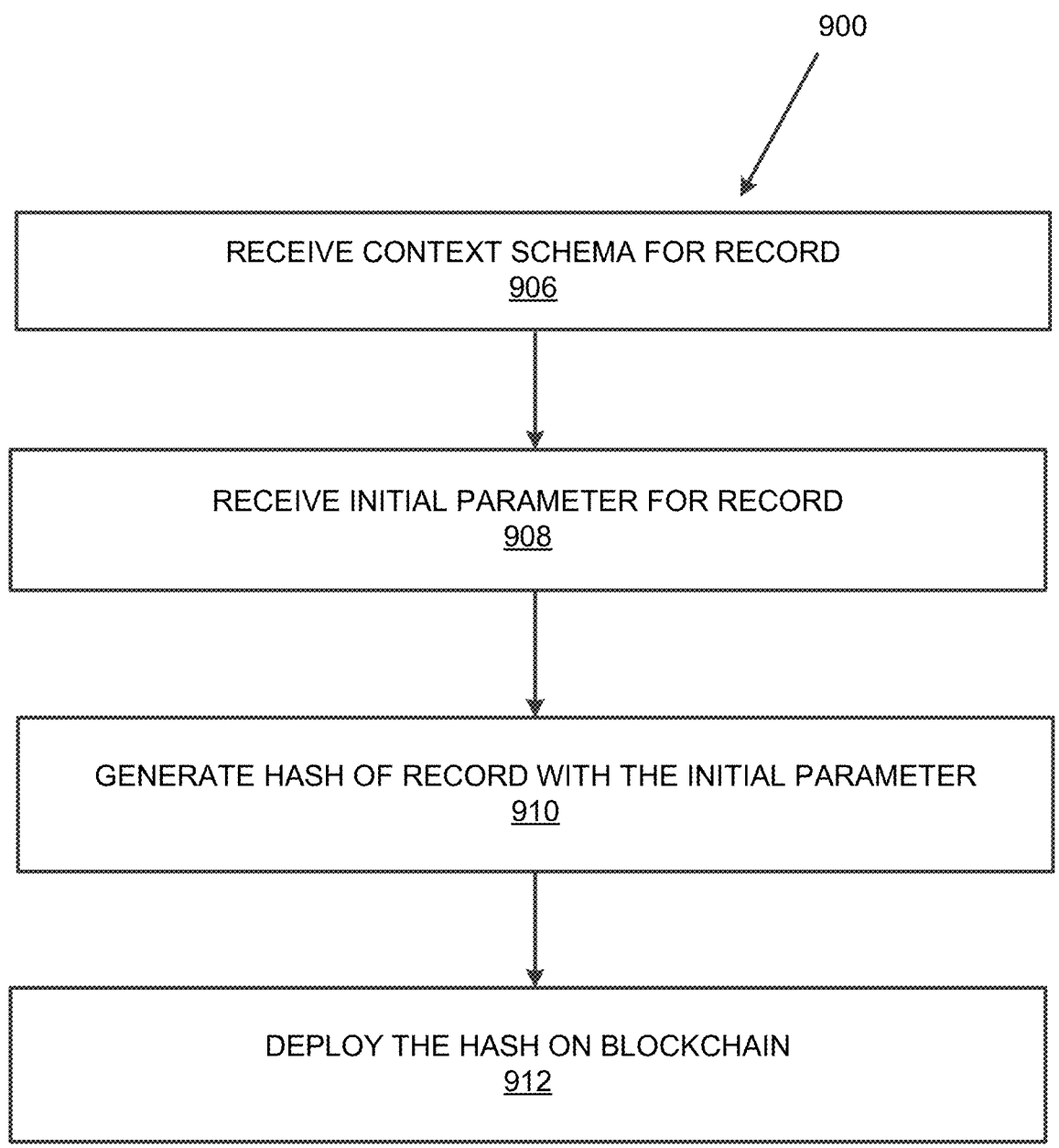

FIG. 9 shows an example of a method 900 for an immutable record on a blockchain.

At block 906, the system 100 may receive a context schema 196 for a record 165. The context schema 196 may provide a state map describing the state of the record 165. The states of the record may provide information about who may create the record 165, who may access the record 165, who may modify the record 165 and such other details. In another example, the configuration file 198 an instance of the context schema 196 may provide a list of possible states for the record 165, such as the actions available for participants on the record 165 and the like. In an example, the context schema 196 may also include a persona list of acceptable personas that can interact with the record in different states. For example, a police report during investigation may be confidential with restricted access to only the detective.

At block 908, the system 100 receive an initial parameter for the record 165. For example, the system 100 may receive information about the initial parameter for the record 165 from the law enforcement officer such as the location or initial reactions of the crime scene and the like.

At block 910, the system 100 may generate a hash of the record 165 based on the record 165 with the initial parameter details. For example, assume the initial parameter is a list of witnesses to a crime scene. The system 100 may generate a hash of the record 165 with the initial parameter filled in to the record 165.

At block 912, the system 100 may deploy the hash of the record 165 as a blockchain object 108 to the blockchain 120. For example, the blockchain object 108 may be deployed on the blockchain 120 using the blockchain service 188.

The system 100 may the store the record 165 in the off-chain storage 110. In an example, the system 100 may receive an update to the record 165. The system 100 may update the record 165. The system 100 may store the updated record 165 in the off-chain storage 110. The system 100 may then generate an updated hash of the updated record. The system 100 may deploy the updated hash to the blockchain 120.

In an example, the system 100 may authenticate the record 165. The system 100 may respond to messages addressed to the blockchain object 108 (e.g., hash of the record 165) on the blockchain 120. The system 100 may use the blockchain monitor 122 to determine events in a block update from the blockchain. The system 100 may place the events in the block update of the blockchain 120 on the event stack 104. The system 100 may determine whether an event on the event stack is a message addressed to the blockchain object 108 on the blockchain 120. In response to a determination that the event is a message, the system 100 may determine the context of addressing of the hash or the blockchain object 108. The system 100 may for example determine whether the message is a request to authenticate the record 165. The system 100 may generate a response to the message or the message blockchain object on the blockchain that authenticates the record 165. The system 100 may generate the response based on the determined context of addressing. In another example, the system 100 may interpret the message as a request to authenticate the actions of a participant. The system 100 may then deploy the response on the blockchain 120.

Although described with reference to blockchain object 108, the system 100 may monitor thousands of blockchain objects and events that may affect these objects on multiple blockchains, with multiple participants.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A blockchain record storage system comprising:
   a processor; and
   a non-transitory computer readable medium storing machine-readable instructions that when executed by the processor cause the processor to:

receive a record including:
 a file; and
 metadata associated with the file;
store a configuration file comprising a state list specifying predetermined states of the record, an action list specifying actions for the predetermined states, and personas approved to perform the actions;
determine a participant associated with the record;
determine a current state of the record;
determine whether the participant is authorized to perform a particular action associated with the record based on an action in the action list that corresponds to the current state, and a persona approved to perform the action that corresponds to the current state as specified in the configuration file;
in response to a determination that the participant is authorized to perform the particular action, generate a hash of the record;
store the record on an off-chain storage; and
deploy the hash to a blockchain.

2. The system according to claim 1, wherein the metadata includes human participants in a chain of custody associated with the file.

3. The system according to claim 1, wherein the record includes details of a commercial transaction.

4. The system according to claim 1, wherein the hash of the record is a decryption key for a media.

5. The system according to claim 1, wherein the record is a proof of purchase of an intangible asset.

6. The system according to claim 1, wherein the machine-readable instructions are executed by the processor to:
 in response to a determination that the participant is not authorized to perform the particular action raise an alert.

7. The system according to claim 1, wherein the machine-readable instructions are executed by the processor to:
 determine a chain of custody specification for the record based on the configuration file; and
 determine based on the metadata whether the record meets the chain of custody specification.

8. The system according to claim 1, wherein the machine-readable instructions are executed by the processor to:
 receive a block update from the blockchain;
 determine a plurality of events in the block update;
 identify an event in the plurality of events addressed to the hash on the blockchain;
 determine whether the identified event is a message addressed to the hash on the blockchain object, and that the message is a request to authenticate the record;
 responsive to determining the identified event is a message addressed to the hash and that the message is a request to authenticate the record, generate a response to the identified event that includes a hash of the identified event and an authentication message; and
 deploy the response to the blockchain.

9. The system according to claim 1, wherein the machine-readable instructions are executed by the processor to:
 receive an update to the record;
 update the record;
 generate an updated hash of the updated record;
 store the updated record on the off-chain storage; and
 deploy the updated hash to the blockchain.

10. The system according to claim 1, wherein the machine-readable instructions are executed by the processor to:
 include machine-readable instructions in a cryptlet associated with the record to regulate access to the record.

11. The system according to claim 1, wherein the machine-readable instructions are executed by the processor to:
 generate an updated hash of the record when the record is accessed on the off-chain storage; and
 deploy the updated hash of the record on the blockchain.

12. The system according to claim 1, wherein the machine-readable instructions are executed by the processor to:
 generate an updated hash of the record when the record on the off-chain storage is tampered; and
 deploy the updated hash on the blockchain.

13. An immutable record storage system comprising:
 a processor; and
 a non-transitory computer readable medium storing machine-readable instructions that when executed by the processor cause the processor to:
  authenticate a participant based on credentials and a configuration file comprising a state list specifying predetermined states of a record, an action list specifying actions for the predetermined states, and personas approved to perform the actions;
  receive a record from the participant;
  determine a current state of the record;
  determine whether the participant is authorized to perform a particular action associated with the record based on an action in the action list that corresponds to the current state, and a persona approved to perform the action that corresponds to the current state as specified in the configuration file;
  wherein the configuration file specifies a parameter corresponding to each of the actions, and in response to a determination that the participant is authorized to perform the particular action,
   generate a user interface that allows the user to perform, on the record, the particular action, and enter a value for a parameter specified in the configuration file that corresponds to the particular action;
  generate a hash of the record; and
  deploy the hash on a blockchain.

14. The system according to claim 13, wherein the machine-readable instructions are executed by the processor to:
 determine a chain of custody specification for the record based on the configuration file; and
 determine based on metadata associated with the record whether the record meets the chain of custody specifications.

15. The system according to claim 13, wherein the machine-readable instructions are executed by the processor to:
 determine a context of addressing of the hash on the blockchain;
 generate a message addressed to a message blockchain object on the blockchain based on the determined context; and
 deploy the message to the blockchain.

16. The system according to claim 13, wherein the machine-readable instructions are executed by the processor to:
 store a hash of the record on off-chain storage.

17. The system according to claim 13, wherein the machine-readable instructions are executed by the processor to:

receive an update to the record;
update the record;
generate an updated hash of the updated record;
store the updated record on off-chain storage; and
deploy the hash of the updated record to the blockchain.

18. The system according to claim 1, wherein the configuration file specifies a parameter corresponding to each of the actions, and in response to the determination that the participant is authorized to perform the particular action, the machine-readable instructions are executed by the processor to generate a user interface that allows the user to perform, on the record, the particular action, and enter a value for a parameter specified in the configuration file that corresponds to the particular action.

19. The system according to claim 1, wherein the configuration file includes constraints for interacting with the record.

20. A blockchain record management system comprising:
a processor; and
a non-transitory computer readable medium storing machine-readable instructions that when executed by the processor cause the processor to:
receive a record;
determine a participant associated with the record;
determine a current state of the record;
access a configuration file comprising a state list specifying predetermined states of the record, an action list specifying actions for the predetermined states, and personas approved to perform the actions;
determine whether the participant is authorized to perform a particular action associated with the record based on an action in the action list that corresponds to the current state, and a persona approved to perform the action that corresponds to the current state as specified in the configuration file;
wherein the configuration file specifies a parameter corresponding to each of the actions, and in response to a determination that the participant is authorized to perform the particular action,
generate a user interface that allows the user to perform, on the record, the particular action, and enter a value for a parameter specified in the configuration file that corresponds to the particular action;
generate a hash of the record;
store the record on an off-chain storage; and
deploy the hash to a blockchain.

* * * * *